United States Patent [19] [11] 3,725,548
Shen et al. [45] Apr. 3, 1973

[54] SUBSTITUTED INDENYL ACETIC ACIDS IN THE TREATMENT OF PAIN, FEVER OR INFLAMMATION

[75] Inventors: Tsung-Ying Shen, Westfield, N.J.; Richard B. Greenwald, Framingham, Mass.; Howard Jones, Holmdel, N.J.; Bruce O. Linn, Somerville, N.J.; Bruce E. Witzell, Westfield, N.J.

[73] Assignee: Merck & Co., Inc., Rahway, N.J.

[22] Filed: Oct. 6, 1971

[21] Appl. No.: 187,197

Related U.S. Application Data

[60] Division of Ser. No. 33,891, May 1, 1970, Pat. No. 3,654,349, which is a continuation-in-part of Ser. No. 848,736, Aug. 8, 1969, abandoned.

[52] U.S. Cl. ..................424/303, 424/248, 424/250, 424/263, 424/270, 424/275, 424/285, 424/304, 424/308, 424/309, 424/317, 424/324
[51] Int. Cl. ............................................A61k 27/00
[58] Field of Search......424/304, 308, 309, 311, 316, 424/317, 324, 303

[56] References Cited

UNITED STATES PATENTS 3,312,730   4/1967   Winters et al. ...................260/470 X

FOREIGN PATENTS OR APPLICATIONS 1,178,658   1/1970   Great Britain
1,815,451   7/1969   Germany Primary Examiner—Stanley J. Friedman
Attorney—Martin L. Katz et al.

[57] ABSTRACT

New substituted indenyl acetic acids and nontoxic pharmaceutically acceptable amides, esters and salts derived therefrom. The substituted indenyl acetic acids disclosed herein have anti-inflammatory, antipyretic and analgesic activity. Also included herein are methods of preparing said indenyl acetic acid compounds, pharmaceutical compositions having said indenyl acetic acid compounds as an active ingredient and methods of treating inflammation by administering these particular compositions to patients.

20 Claims, No Drawings

SUBSTITUTED INDENYL ACETIC ACIDS IN THE TREATMENT OF PAIN, FEVER OR INFLAMMATION

CROSS REFERENCES TO RELATED APPLICATIONS

This application is a division of copending U.S. application Ser. No. 33,891 filed May 1, 1970 now U.S. Pat. No. 3,654,349 which, in turn, is a continuation-in-part of U.S. Ser. No. 848,736, filed Aug. 8, 1969 now abandoned.

BACKGROUND OF THE INVENTION

The development of anti-inflammatory compounds in the past two decades has seen the growth of a great many new drugs. Most of these have been steroids of the 11-oxygenated pregnane series. These, while highly effective as anti-inflammatory agents, have many side effects. More recently, nonsteroidal anti-inflammatory compounds, such as the idenyl, indolyl and salicylic acids, of much simpler structure than the steroidal anti-inflammatory compounds have been developed.

An object of this invention is the development of new potent anti-inflammatory compounds. A further object of this invention is the development of anti-inflammatory compounds having an increased therapeutic index. A still further object of this invention is the development of anti-inflammatory compounds which are highly desirable therapeutic agents in that metabolism of the drug in the body will not result in the formation of undesirable insoluble products which may impair the functioning of the renal system. Another object of this invention is the development of potent analgesic compounds.

SUMMARY OF THE INVENTION

Generally, this invention relates to new substituted indenyl acetic acid compounds and processes for producing the same. This invention also relates to pharmaceutical compositions containing said indenyl acetic acid compounds as an active ingredient and to methods of treating pain, fever or inflammation by administering these particular compositions to patients.

DESCRIPTION AND PREFERRED EMBODIMENTS

This invention relates to new substituted indenyl acetic acids and processes for producing the same. More specifically, this invention relates to substituted indenyl acetic acids, amides, esters and non-toxic pharmaceutically acceptable salts thereof. Still more specifically, this invention relates to compounds having the following general formula:

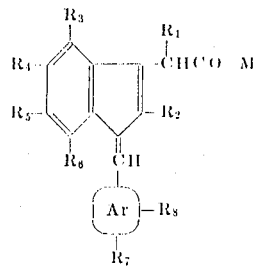

wherein:
Ar may be aryl or heteroaryl;
$R_1$ may be hydrogen, loweralkyl or halogenated loweralkyl;
$R_2$ may be hydrogen or alkyl;
$R_3$, $R_4$, $R_5$ and $R_6$ each may be hydrogen, alkyl, acyloxy, alkoxy, nitro, amino, acylamino, alkylamino, dialkylamino, dialkylaminoalkyl, sulfamyl, alkylthio, mercapto, hydroxy, hydroxyalkyl, alkylsulfonyl, halogen, cyano, carboxyl, carbalkoxy, carbamido, halogenoalkyl, cycloalkyl or cycloalkoxy;
$R_7$ may be alkylsulfinyl or alkylsulfonyl;
$R_8$ may be hydrogen, halogen, hydroxy, alkoxy, or halo-alkyl; and
M may be hydroxy, loweralkoxy, substituted loweralkoxy, amino, alkylamino, dialkylamino, N-morpholino, hydroxyalkylamino, polyhydroxyalkylamino, dialkylaminoalkylamino, aminoalkylamino, and the group oMe, in which Me is a cation.

The indene nucleus may be substituted in the 1-position by an aryl ring system such as benzene, napthalene or biphenyl or a heteroaryl ring system such as a pyrrole, furan, thiophene, pyridine, imidazole, pyrazine, thiazole, etc. which contains an alkylsulfinyl or alkylsulfonyl substituent and may be further substituted with a halogen (chloro, fluoro or bromo), hydroxy, alkoxy (methoxy, ethoxy, propoxy, etc.) or haloalkyl (fluoromethyl, chloromethyl, trifluoromethyl, etc.) group.

In the most preferred compounds of this invention $R_3$, $R_4$, $R_5$ and $R_6$ each may be halogen (fluoro, chloro or bromo), loweralkoxy (methoxy, ethoxy, i-propoxy, etc.) loweralkyl (methyl, ethyl, propyl, isopropyl, etc.), nitro, amino or substituted amino such as dialkylamino, acylamino, alkylamino, etc. $R_3$, $R_4$, $R_5$ and $R_6$ are not however limited to this class and may, if desired, represent substitutents such as hydrogen, aryl, aryloxy, hydroxy, mercapto, haloalkyl, sulfamyl, carboxy, carboalkoxy, carbamido and many other groups.

Representative compounds of this invention are as follows:
5-Hydroxy-2-methyl-1-p-methylsulfinylbenzylidene-3-indene acetic acid;
5-Methoxy-2-methyl-1-p-methylsulfinylbenzylidene-3-indene acetic acid;
5-Fluoro-2-methyl-1-p-methylsulfinylbenzylidene-3-indene acetic acid;
α-(5-Fluoro-2-methyl-1-p-methylsulfinylbenzylidene-3-indene)propionic acid;
5,6-Difluoro-2-methyl-1-p-methylsulfinylbenzylidene-3-indene acetic acid;
5-Chloro-2-methyl-1-p-methylsulfinylbenzylidene-3-indene acetic acid;
5-Trifluoromethyl-2-methyl-1-p-methylsulfinylbenzylidene-3-indene acetic acid;
5-Methyl-2-methyl-1-p-methylsulfinylbenzylidene-3-indene acetic acid;
5,7-Difluoro-2-methyl-1-p-methylsulfinylbenzylidene-3-indene acetic acid;
α-(5,7-Difluoro-2-methyl-1-p-methylsulfinylbenzylidene-3-indene)propionic acid;
5-Dimethylamino-6-fluoro-2-methyl-1-p-methylsulfinylbenzylidene-3-indene acetic acid;
5-Methoxy-6-fluoro-2-methyl-1-p-methylsulfinylbenzylidene-3-indene acetic acid;
α-(5-Methoxy-6-fluoro-2-methyl-1-p-methylsulfinylbenzylidene-3-indene)propionic acid;
α-(5,6-Difluoro-2-methyl-1-p-methylsulfinylbenzylidene-3-indene)propionic acid;

5-Methoxy-2-methyl-1-p-methylsulfonylbenzylidene-3-indene acetic acid;

5-Fluoro-2-methyl-1-p-methylsulfonylbenzylidene-3-indene acetic acid;

5,6-Difluoro-2-methyl-1-p-methylsulfonylbenzylidene-3-indene acetic acid;

5,7-Difluoro-2-methyl-1-p-methylsulfonylbenzylidene-3-indene acetic acid;

5-Dimethylamino-6-fluoro-2-methyl-1-p-methylsulfonylbenzylidene-3-indene acetic acid;

5-Methoxy-6-fluoro-2-methyl-1-p-methylsulfonylbenzylidene-3-indene acetic acid;

α-(2-Methyl-5,6-difluoro-1-p-methylsulfonylbenzylidene-3-indene)propionic acid;

and the corresponding amides, esters and salts.

It should be noted that the compounds of this invention may be isomerized into their cis and trans isomers by procedures well known in the art. It should be further noted that the cis isomer of the compounds of this invention is substantially more active than the trans isomer. Accordingly, it is to be understood that reference throughout the specification and appended claims to the compounds of this invention is intended to encompass not merely the compounds per se but includes their geometric isomers (cis, trans).

It should be further noted by one skilled in the art that the alkylsulfinyl derivatives of this invention are racemic mixtures of optically active enantiomorphs which may be resolved into their (+) and (−) forms by techniques well known in the art. Furthermore, when $R_1$ is loweralkyl an additional asymmetric atom results which gives rise to two additional enantiomorphs, which are also considered to be within the scope of the invention.

One skilled in the art should further note that some of the compounds of this invention are polymorphic and have different crystalline structures, melting points and solubility characteristics.

This invention also relates to a method of treating pain, fever or inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of the instant invention have better potency at the same dosage levels than similar type compounds known in the prior art and exhibit a lower incidence of ulcerogenic side effects. Furthermore, the compounds of the instant invention are substantially more water-soluble than similar prior art compounds.

The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

In the preparation of the compounds of this invention, the starting material is a β-aryl propionic acid. This compound is prepared according to the procedure shown in Flow Sheet I which illustrates several alternative routes. Thus, a substituted benzaldehyde may be condensed with a substituted acetic ester in a Claisen Reaction or with an α-halogenated propionic ester in a Reformatsky Reaction. The resulting unsaturated ester is reduced and hydrolyzed to give the benzyl propionic acid starting material. Alternatively, a substituted malonic ester in a typical malonic ester synthesis and acid hydrolysis of the resulting substituted ester yields and benzyl propionic acid directly or the benzaldehyde may be reacted with propionic anhydride in a reducing medium to form the benzyl propionic acid.

Equivalents:

X is halogen, usually Cl or Br;

E is esterifying group, usually methyl, ethyl or benzyl;

$R_2$ is hydrogen or alkyl;

$R_3$, $R_4$, $R_5$ and $R_6$ each may be hydrogen, alkyl, acyloxy, alkoxy, nitro, amino, acylamino, alkylamino, dialkylamino, dialkylaminoalkyl, sulfamyl, halogen, alkylthio, mercapto, hydroxy, hydroxyalkyl, alkylsulfonyl, cyano, carboxyl, carbalkoxy, carbamido, halogenoalkyl, cycloalkyl, or cycloalkoxy.

Reagents:

1. Zn dust in anhydrous inert solvent such as benzene and ether.
2. $KHSO_4$ or p-toluene sulfonic acid.
3. $NaOC_2H_5$ is anhydrous ethanol at room temperature.
4. $H_2$, palladium on charcoal, 40 p.s.i., room temperature.
5. NaOH in aqueous alcohol at 20°–100°.
6. $NaOC_2H_5$ or any other strong base such as NaOH or K-t-butoxide.
7. Acid.

I. Preparation of β-arylpropionic acid starting material.

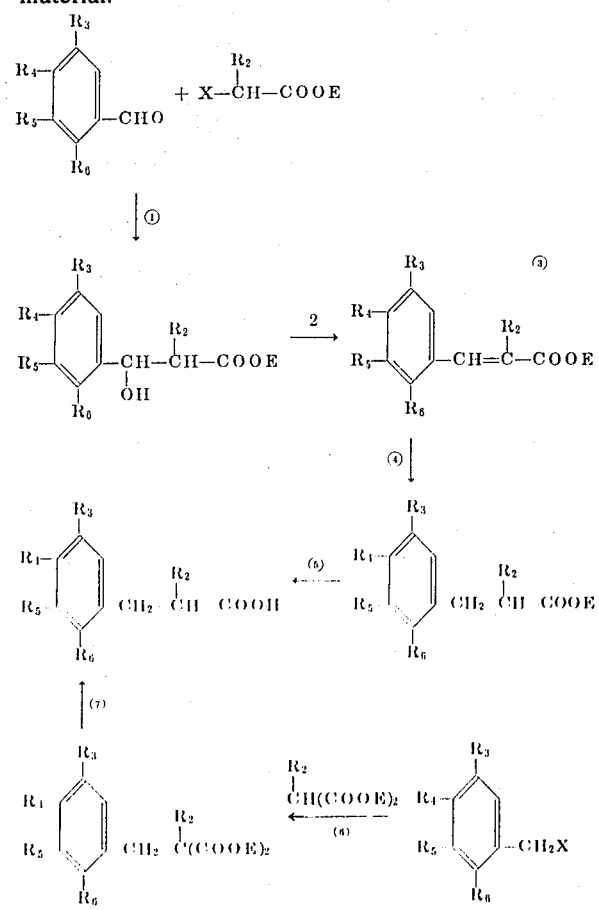

In the preparation of the compounds of the instant invention, again a number of routes are possible, as shown in Flow Sheet II. The first step is ring closure of the β-aryl propionic acid to form an indanone which may be carried out by a Friedel-Crafts Reaction using a Lewis acid catalyst or by heating with polyphosphoric acid. The indanone may be condensed with an α-halo ester in the Reformatsky Reaction to introduce the aliphatic acid side chain by replacing the carbonyl group. Alternatively, this introduction can be carried out by the use of a Wittig Reaction in which the reagent is an α-triphenylphosphinyl ester, a reagent which replaces the carbonyl with a double bond to a carbon. This is immediately rearranged into the indene. If the Reformatsky Reaction route is used, the intermediate 3-hydroxy-3-aliphatic acid derivative must be dehydrated to the indene. The introduction of the 1-substituent is carried out in one of two ways. The first is the direct reaction of the indene with the aldehyde of the structural characteristics defined, using a strong base as a catalyst and warming, if necessary, to form the carbanion. The reaction can be carried out in a number of solvents such as polar solvents like dimethoxyethane, aqueous methanol, pyridine, liquid ammonia, dimethylformamide and the like or even in non-polar solvents such as benzene, etc. Alternatively, an indanone can be brominated and then dehydrogen-brominated to an indenone and the indenone carbonyl replaced by the substituent using the α-triphenyl-phosphinyl compounds of the desired structure. Note that E in the third stage and in the fifth stage is a loweralkoxy group and thus forms a loweralkyl ester of the desired compound. This ester can then be hydrolyzed to give the free acids and oxidized to give the sulfoxides and sulfones from which the salts, other esters and the amides may be formed. Step 6 can also be carried out when E is hydrogen.

Equivalents:

X, E, $R_2$, $R_3$, $R_5$ and $R_6$ are the same as in Flow Sheet I;

$R_1$ is hydrogen, loweralkyl or halogenated loweralkyl;

R is hydrogen or loweralkyl;

$R_8$ is hydrogen, halogen, hydroxy, alkoxy or haloloweralkyl.

Reagents:

1. Friedel-Crafts Reaction using a Lewis Acid catalyst.
2. Heat with polyphosphoric acid.
3. Reformatsky Reaction: Zn in inert solvent, heat.
4. p-Toluene sulfonic acid and $CaCl_2$ or $I_2$ at 200°.
5. Wittig Reaction using $(C_6H_5)_3P=CHCOOE$ at 20°–120bL in ether, benzene, toluene, xylene, etc.
6. Reaction with aldehyde or ketone, using strong base as catalyst (K-t-butoxide or any alkoxide, NaOH, KOH, $NaNH_2$, etc.), warming if necessary to form the carbanion in solvents such as liquid ammonia, dimethylformamide, 1,2-dimethoxyethane, pyridine, aqueous alcohol, etc.

II. Preparation of α-(1-substituted-methylenyl-3-indenyl)aliphatic acids.

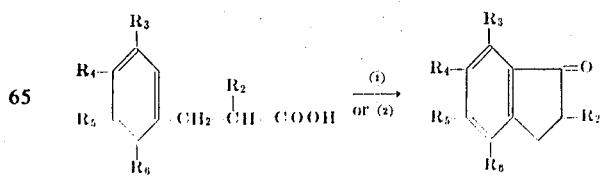

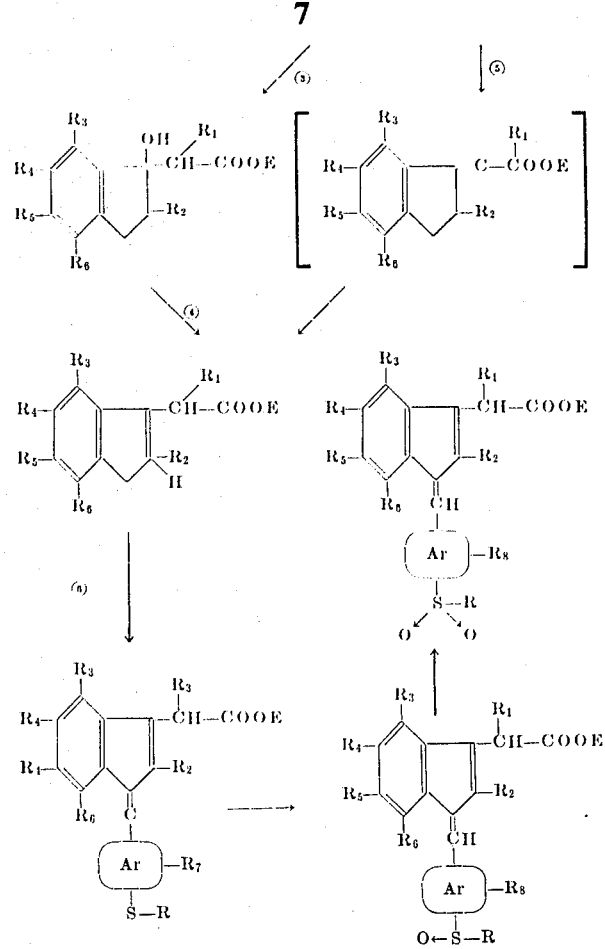

Although the synthesis described produce esters of the acids of this invention, some desired esters are more easily obtained by forming a simple ester of the final acid, hydrolyzing to the free acid and re-esterifying. The simple loweralkyl or benzyl esters are usually the ones used in the synthesis of the compounds. Other esters are more desirable from the standpoint of therapeutic utility of the compounds, such as the methoxymethyl, diethylaminoethyl, dimethylaminoethyl, dimethylaminopropyl, diethylaminopropyl, N-pyrollidinylethyl, N-piperidinylethyl, N-morpholinylethyl, N-ethyl-2-piperidinylethyl, N-pyrrolidinylmethyl, N-methyl-2-pyrollidinylmethyl, 4-methyl-1-piperazinylethyl, methoxyethyl, ethoxyethyl, and the like. These are mostly prepared from the corresponding alcohol and the indenyl acid.

The amines, both the simple amide and the substituted amides, are similarly prepared from the indenyl acids and the corresponding amines. Especially useful therapeutically are the morpholide, the bis(hydroxyethyl)amide and the like.

Similarly, salts are obtained by neutralizing the indenyl acids with bases or by methathesis of other salts. Especially useful are the metallic salts such as the alkali metal or alkaline earth salts and the amine and quaternary ammonium salts, which are water soluble, but the heavy metal salts such as iron, alumminum, etc. are also useful for some purposes.

The following examples are presented to further illustrate the invention:

EXAMPLE 1

α-Methyl-β-(p-methylthiophenyl)propionic acid

To a solution of 2.3 g. (0.1 mole) of sodium in 100 ml. of absolute alcohol is added 17.4 g. (0.1 mole) of diethyl methylmalonate and 17.3 g. (0.1 mole) of p-methylthiobenzylchloride. The mixture is heated under a reflux in a water bath for 3 hours. The reaction mixture is poured into water and the aqueous solution is extracted six times with ether and dried. It is then evaporated to yield diethyl methyl-p-methylthiobenzyl malonate. The crude product is then saponified by heating with excess 4 percent sodium hydroxide in aqueous ethanolic solution. The solution thus formed is concentrated, extracted with ether to remove any neutral material, and acidified with dilute sulfuric acid. The acidic mixture is heated on a steam bath for 1 hour, cooled and then extracted with ether. Evaporation of the ether solution gives α-methyl-β-(p-methylthiophenyl)propionic acid.

In a similar manner, using other substituted malonic esters in place of diethyl methylmalonate and other substituted benzyl halides in place of p-methylthiobenzyl chloride, the corresponding substituted propionic acids are obtained, for example:
α-methyl-β-(p-methoxyphenyl)propionic acid,
α-allyl-β-(p-nitrophenyl)propionic acid.

B. 6-Methoxy-2-methylindanone

α-Methyl-β-(p-methoxyphenyl)propionic acid (15 g.) is added to 170 g. of polyphosphoric acid at 50° and the mixture is heated at 83°–90° for 2 hours. The syrup is poured into iced water, stirred for one-half hour and then extracted with ether three times. The ether solution is washed with water twice and 5% NaHCO₃ five times until all the acidic material has been removed. The remaining neutral solution is washed with water and dried over sodium sulfate. Evaporation of the solution gives the indanone as a pale yellow oil.

In a similar manner, other α-aryl propionic acid compounds are converted to the corresponding indanone by the procedure of this example.

C. Methyl-5-methoxy-2-methyl-3-indenylacetate

A solution of 13.4 g. of 6-methoxy-2-methylindanone and 19.3 g. of methyl bromoacetate in 45 ml. benzene is added over a period of 5 minutes to 21 g. of zinc amalgam (prepared according to Org. Syn. Coll., vol. 3) in 110 ml. benzene and 40 ml. dry ether. A few crystals of iodine are added to start the reaction, and the reaction mixture is maintained at reflux temperature (ca. 65°) with external heating. At 3 hour intervals two batches of 10 g. zinc amalgam and 10 g. bromoester are added and the mixture is then refluxed for 8 hours. After addition of 30 ml. of ethanol and 150 ml. of acetic acid, the mixture is poured into 700 ml. of 1:1 aqueous acetic acid. The organic layer is separated, and the aqueous layer is extracted twice with ether. The combined organic layers are washed thoroughly with water, ammonium hydroxide and water. Drying over sodium sulfate, evaporation of solvent in vacuo followed by pumping at 80° (bath temp.) (1–2 mm.) gives crude methyl (1-hydroxy-2-methyl-6-methoxy-indenyl)acetate.

A mixture of the above crude hydroxyester, 20 g. of p-toluenesulfonic acid monohydrate and 20 g. of anhydrous calcium chloride in 250 ml. toluene is refluxed overnight. The solution is filtered and the solid residue is washed with benzene. The combined benzene solution is washed with water, sodium bicarbonate, water and then dried over sodium sulfate. After evaporation the crude methyl 5-methoxy-2-methyl-3-indenylacetate is chromatographed on acid-washed alumina, and the product is eluted with petroleum ether-ether (v./v. 50–100%).

Methyl 2,5-dimethyl-3-indenylacetate

The above reactions of Example 1C are repeated except that the starting materials are 2,5-dimethylindanone and methylbromoacetate. Using the same reaction conditions and techniques there is obtained methyl 2,6-dimethyl-3indenylacetate.

The above reactions of Example 1C are repeated except that the starting materials are 6-methylthioindanone and methylbromoacetate. Using the same reaction conditions and techniques, there is obtained methyl 5-methylthio-2-methyl-3-indenylacetate.

When any of the other indanones described in the other examples of the specification are used in the above procedure in place of 6-methoxy-2-methylindanone the corresponding methyl ester is obtained.

D. 5-Methoxy-2-methyl-1(p-methylthiobenzylidene)-3-indenyl acetic acid.

To a solution of methyl 5-methoxy-2-methyl-3-indenylacetate 8.7 g. (0.037 mole) and p-methylthiobenzaldehyde, 6.3 g. (1.1 equivalent) is added 16+ml. (2.0+ equivalents) of 25 percent methanolic sodium methoxide. The mixture is stirred at reflux under nitrogen for 2 hours. An equal volume of water is added dropwise and refluxing continues for 30 min. The solution is cooled, diluted with water and extracted with ether (3X). Residual ether is blown off with nitrogen and then the aqueous solution is acidified with 50 percent glacial acetic acid. The precipitated product is collected and washed thoroughly with water. The crude product is crystallized from methanol to give pure 5-methoxy-2-methyl-1-(p-methylthiobenzylidene)-3-indenylacetic acid (m.p. 195°–196°).

5-Methoxy-2-methyl-1-(p-ethylthiobenzylidene)-3-indenyl acetic acid

The above reaction of Example 1D is repeated using p-ethylthiobenzaldehyde instead of p-methylthiobenzaldehyde. Using the same reaction conditions and techniques, there is obtained 5-methoxy-2-methyl-1-(p-ethylthiobenzylidene)-3-indenyl acetic acid.

5-Hydroxy-2-methyl-1-(p-methylthiobenzylidene)-3-indenyl acetic acid

The reaction of Example 1D is repeated except that the starting materials are methyl 5-hydroxy-2-methyl-3-indenylacetate and p-methylthiobenzaldehyde. Using the same reaction conditions and techniques, there is obtained 5-hydroxy-2-methyl-1-p-methylthiobenzylidene)-3-indenyl acetic acid.

The other methyl esters of Example 1C are reacted with p-methylthiobenzaldehyde according to the above procedure to produce the corresponding indenyl acetic acid.

E. 5-Methoxy-2-methyl-1-(p-methylsulfinylbenzylidene)-3-indenylacetic acid

A solution of sodium periodate (0.214 g.) (0.001 mole) in 3 ml. of water is added dropwise to 5-methoxy-2-methyl-1-(p-methylthiobenzylidene)-3-indenylacetic acid (0.352 g.) (0.001 mole) in 25 ml. methanol and enough acetone to cause solution. This solution is stirred overnight at room temperature and filtered. The filtrate is evaporated at 30° to a small volume which causes the product to precipitate. The suspension is diluted with several volumes of water, cooled and collected. The product is dried in vacuo over potassium hydroxide pellets and then in a vacuum oven at 70° to give 5-methoxy-2-methyl-1-(p-methylsulfinylbenzylidene)-3-indenylacetic acid (m.p. 200.5°–203.5°).

5-Methoxy-2-methyl-1-(p-methylsulfonylbenzylidene)-3-indenylacetic acid is prepared by the addition of 1.0 mole of m-chloroperbenzoic acid per mole of 5-methoxy-2-methyl-1-(p-methylsulfinylbenzylidene)-3-indenylacetic acid in an acetone solution.

EXAMPLE 2

A. 6-Methoxy-2-methylindanone

In a 500 ml. three-necked flask is placed 36.2 g. (0.55 mole) of zinc dust and in a 250 ml. addition funnel is charged a solution of 80 ml. anhydrous benzene, 20 ml. of anhydrous ether, 80 g. (0.58 mole) of p-anisaldehyde and 98 g. (0.55 mole) of ethyl-2-bromopropionate. About 10 ml. of the solution is added to the zinc dust with vigorous stirring and the mixture is warmed gently until an exothermic reaction commences. The remaining reactants are added dropwise at such a rate that the reaction mixture is refluxing smoothly on its own accord (ca. 30–35 min.). After addition is completed the mixture is placed in a water bath and refluxed for 30 minutes. After cooling to 0°, 250 ml. of 10 percent sulfuric acid is added with vigorous stirring. The benzene layer is extracted twice with 50 ml. portions of 5 percent sulfuric acid and washed twice with 50 ml. portions of water. The aqueous acidic layers are combined and extracted with 2 × 50 ml. ether. The combined ethereal and benzene extracts are dried over sodium sulfate. Evaporation of solvent and fractionation of the residue through a 6 inch Vigreux column affords the product, ethyl 2-hydroxy-(p-methoxyphenyl)-1-methylpropionate, b.p. 155°–160°(1.5 mm.).

By the method described in Vander Zanden, Rec. trav. chim., 68, 413 (1949), the above compound is converted to 6-methoxy-2-methylindanone.

5-Ethyl-2-methylindanone

The above reactions of Example 2A are repeated except that the starting materials are o-ethylbenzaldehyde and ethyl-2-bromopropionate. Using the same reaction conditions and techniques there is obtained 5-ethyl-2-methylindanone.

When the following benzaldehydes are utilized in the procedure of Example 2A, the corresponding indanone is obtained:

| Aldehyde | Inadone |
|---|---|
| p-, o-, or m-tolualdehyde | 2,6-dimethyl, 2,5-dimethyl, or 2,4-dimethylindanone |
| p-, o-, or m-hydroxybenzaldehyde | 4,5-or 6-hydroxy-2-methylindanone |
| p-, o-, or m-nitroben- | 2-methyl-(4,5 or 6)-nitro- |

| aldehyde | indanone |
|---|---|
| p-, o-, or m-chlorobenz-aldehyde | (4,5 or 6)-chloro-2-methylindanone |
| p-, o-, or m-cyanobenz-aldehyde | (4,5 or 6)-cyano-2-methylindanone |
| Vanillin | 6-hydroxy-5-methoxy-2-methylindanone |
| p-, o-, or m-sulfamylbenz-aldehyde | 2-methyl-(4,5 or 6)-sulf-amylindanone |
| 3-chloro-4-methylbenzalde-hyde | 5-chloro-2,6-dimethyl-indanone |
| 4-carbamido-5-methylbenz-aldehyde | 6-carbamido-2,5-dimethyl-indanone |
| 3,4-difluorobenzaldehyde | 5,6-difluoro-2-methylinda-none |

B. 5-Methoxy-2-methyl-1-(p-methylsulfinylbenzylidene)-3-indenylacetic acid

The reactions of Example 1C, 1D and 1E are repeated and 5-methoxy-2-methyl-1-(p-methylsulfinylbenzylidene)-3-indenylacetic acid is obtained.

EXAMPLE 3

A. Methyl α-(5-methoxy-2-methyl-3-indenyl)propionate

The procedure of Example 1C is followed using methyl α-bromopropionate in equivalent quantities in place of methyl bromoacetate used therein. There is obtained methyl α-(1-hydroxy-6-methoxy-2-methyl-1-indenyl)propionate and it is then dehydrated to methyl α-(5-methoxy-2-methyl-3-indenyl)propionate in the same manner.

B. α-[1-(p-Methylthiobenzylidene)-2-methyl-5-methoxy-3-indenyl]propionic acid To a solution of 0.5 g. (0.00192 mole) of methyl α-(5-methoxy-2-methyl-3-indenyl)propionate and 0.595 g. (0.0039 mole) of p-methylthiobenzaldehyde in 3 ml. of anhydrous pyridine is added 1.63 g. of a 40 percent solution of benzyltrimethylammonium hydroxide (Triton-B) in methanol. The resulting red-purple solution is allowed to stir at room temperature overnight.

The reaction mixture is poured into a mixture of ice and water, acidified with 2.5 N HCl and extracted with ether. The ether solution is then washed with 2.5 N HCl until the washing acidifies (once), then with water until neutral. The ether layer is then extracted with 5 percent $Na_2CO_3$ solution. The $Na_2CO_3$ solution is washed with ether, acidified and extracted with ether. The ether solution is washed with water, dried over $Na_2SO_4$, and concentrated in vacuo to a yellow oil which foams up to a clear yellow solid on pumping at 0.5–1 mm. Thin layer chromatography of the product shows only one spot when eluted with a (v./v. 4:3:5) of isopropanol: 10% $NH_4OH$: ethyl acetate mixture:

U.V. absorption: λmax. 3525, 2910, 2540, 2450. E% 399, 260, 510 and 498.

C. α-[1-(p-Methylsulfinylbenzylidene)-2-methyl-5-methoxy-3-indenyl]-propionic acid The procedure of Example 1E is followed using α-[1-(p-methylthiobenzylidene)-2-methyl-5-methoxy-3-indenyl]-propionic acid in place of 5-methoxy-2-methyl-1-(p-methylthiobenzylidene)-3-indenylacetic acid thereby producing α-[1-(p-methylsulfinylbenzylidene)-2-methyl-5-methoxy-3-indenyl]-propionic acid (m.p. 115°–120°).

α-[1-(p-Methylsulfonylbenzylidene)-2-methyl-5-methoxy-3-indenyl]-propionic acid is produced by the addition of 1.0 mole of m-chloroperbenzoic acid per mole of α-[1-(p-methylsulfinylbenzylidene)-2-methyl-5-methoxy-3-indenyl]-propionic acid as described in Example 1E.

EXAMPLE 4

A. Methyl 3-hydroxy-2-methyl-5-nitro-3-indenylacetate

The procedure of Example 1C is followed using 2-methyl-6-nitro indanone in equivalent quantities in place of 6-methoxy-2-methyl indanone used therein. After the mixture is condensed, 30 ml. of ethanol and 50 ml. of acetic acid are added. The mixture is then poured into 700 ml. of water. Extraction with ether gives methyl 3-hydroxy-2-methyl-5-nitro-3-indenylacetate.

B. Methyl 5-dimethylamino-2-methyl-3-indenylacetate

A solution of 0.05 mole of methyl 3-hydroxy-2-methyl-5-nitro-3-indenylacetate, 0.2 mole of 38 percent aqueous formaldehyde and 2 ml. of acetic acid in 100 ml. ethanol is reduced catalytically in the presence of a 10% Pd/C catalyst under 40 lb. p.s.i. hydrogen pressure at room temperature. The solution is filtered, evaporated and chromatographed on 300 g. of silica gel to give methyl 5-dimethylamino-3-hydroxy-2-methyl-3-indenylacetate. The hydroxy ester is then dehydrated to methyl 5-dimethylamino-2-methyl-3-indenylacetate.

C. 1-p-Methylthiobenzylidene-5-dimethylamino-2-methyl-3-indenyl acetic acid To a solution of 2.5 g. of the ester from Part B of this example in 15 ml. of 1,2-dimethoxyethane at 0° is added 1.5 g. of p-methylthiobenzaldehyde followed by 1.1 g. of potassium t-butoxide. The reaction mixture is kept in the ice-bath for 4 hours and then allowed to stand at room temperature for 18 hours. The mixture is diluted with 15 ml. of ether and the potassium salt is filtered. The salt is dissolved in 30 ml. of water and neutralized with dilute hydrochloric acid to pH 6–6.5. The crude acid precipitated is collected by filtration and chromatographed on a silica gel column, using ether-petroleum ether (v./v. 50–100 percent) as eluent to give pure 1-p-methylthiobenzylidene15-dimethylamino-2-methyl-3-indenylacetic acid which may be oxidized to 1-p-methylsulfinylbenzylidene-5-dimethylamino-2-methyl-3-indenylacetic acid and 1-p-methylsulfonylbenzylidene-5-dimethylamino-2-methyl-3-indenylacetic acid as described above.

EXAMPLE 5

α-[1-(p-Methylsulfinylbenzylidene)-2-methyl-5-dimethylamino-3-indenyl]-propionic acid The procedure of Examples 2A, B and C is followed using 6-dimethylamino-2-methylindanone in place of 6-methoxy-2-methylindanone and methyl α-bromopropionate in place of methyl bromoacetate used therein. There is obtained α-[1-(p-methylsulfinylbenzylidene)-2-methyl-5-dimethylamino-3-indenyl]-propionic acid.

EXAMPLE 6

A. 3,4-Difluorobenzaldehyde

In a 250 ml. three-necked flask equipped with a magnetic stirrer, thermometer, condenser, and dropping funnel is placed 25.6 g. (0.2 mole) of 3,4-difluorotoluene. The liquid is heated to 105° and illuminated as 67 g. (0.42 mole) of bromine is added slowly. The temperature is kept between 105°–110° while the first half of the bromine is added over a period of 1 hour. The rest of the bromine is added over approx. a 2 hour period and the temperature is raised to 150° and kept there for 5 minutes. The reaction mixture is cooled and transferred to a 1 liter 3-necked flask with a motor driven stirrer and condenser. 120 ml. $H_2O$ and 90 g. of calcium carbonate is added and the mixture is refluxed for 20 hours with good stirring. The reaction mixture is steam distilled until no further oil is collected. The oil is taken up in methylene chloride and dried over $MgSO_4$. Evaporation of the solvent yields 3,4-difluorobenzaldehyde which is used without further purification.

B. 3,4-Difluoro-α-methylcinnamic acid

A mixture of 2.88 g. (0.02 mole) of 3,4-difluorobenzaldehyde, 3.24 g. (0.025 mole) of propionic anhydride and 0.92 g. (0.02 mole) of sodium propionate under nitrogen is heated at 135° with magnetic stirrer for 20 hours. The reaction mixture is poured onto 50 ml. of water. A solid precipitates which dissolves when 50 ml. of saturated $K_2CO_3$ is added with stirring. The basic solution is extracted with ether (2 × 100 ml.). The aqueous phase is then poured into an excess of concentrated HCl and ice. The precipitated white solid is filtered and dried to give 3,4-difluoro-α-methylcinnamic acid, m.p. 122°–125°.

4-Trifluoromethyl-α-methylcinnamic acid

The above reaction of Example 6A is repeated except that 4-trifluoromethylbenzaldehyde is used as a starting material in place of 3,4-difluorobenzaldehyde. Using the same reaction conditions and techniques there is obtained 4-trifluoromethyl-α-methylcinnamic acid.

Similarly using other benzaldehydes such as 4-methylthiobenzaldehyde, 4-chlorobenzaldehyde, and 3-methyl-4-chlorobenzaldehyde, there is obtained 4-methylthio-α-methylcinnamic acid, 4-chloro-α-methylcinnamic acid and 3-methyl-4-chloro-α-methylcinnamic acid respectively.

C. 3,4-Difluoro-α-methylhydrocinnamic acid

28 G. (0.141 mole) of 3,4-difluoro-α-methylcinnamic acid, 1 g. of $PtO_2$ in 250 ml. of MeOH is hydrogenated at 45 p.s.i. until the theoretical uptake is completed. The catalyst is filtered off and the material evaporated to one-third its volume. A 15 percent potassium hydroxide solution (10 ml.) is added and the mixture refluxed for 30 minutes when it is poured into water and extracted with ether (2 × 100 ml.). The aqueous layer is acidified with concentrated HCl and ice. The oil which comes out is extracted into ether, the ether solution dried over $MgSO_4$ and evaporated to leave a clear oil which crystallizes. 3,4-Difluoro-α-methylhydrocinnamic acid, m.p. 55°–56°, is isolated.

D. 5,6-Difluoro-2-methyl-1-indanone

20 G. (0.1 mole) of 3,4-difluoro-α-methylhydrocinnamic acid is added to 250 g. of polyphosphoric acid. The mixture is efficiently stirred and heated on a steam bath for 2 hours. The mixture is poured onto ice-water (400 ml.). The precipitate is extracted with ether (3 × 100 ml.). The extract is washed with saturated potassium carbonate, water and then dried ($MgSO_4$). The ether solution when evaporated leaves solid 5,6-difluoro-2-methyl-1-indanone (m.p. 66°–68°) which is used without further purification.

E. 5,6-Difluoro-2-methylindene-3-acetic acid methyl ester

A mixture of 9.1 g. (0.05 mole) of 5,6-difluoro 2-methyl-1-indanone, 4.0 g. of "activated" zinc dust, 7.6 g. (0.05 mole) of methyl bromoacetate and a crystal of iodine in 250 ml. of dry benzene is refluxed for 4–5 hours. Tlc (20% $Et_2O$ – 80% pet. ether on Si gel) shows greater than 95 percent conversion at this time. The reaction mixture is poured onto 250 ml. of 5% $H_2SO_4$, separated, and dried ($MgSO_4$). Removal of solvent leaves an oily hydroxy ester. The crude ester is redissolved in 100 ml. of benzene and phosphorus pentoxide (20 g.) is added. The mixture is refluxed for 30 minutes (no stirrer necessary) and decanted. The residue is washed with benzene, the organic layers combined, washed with water (2 × 100 ml.) and dried ($MgSO_4$). The benzene when evaporated leaves 5,6-difluoro-2-methylindene-3-acetic acid methyl ester, m.p. 86°–90°.

5-Methylthio-2-methylindene-3-acetic acid ester

The above reaction of Example 6E is repeated using 5-methylthio-2-methylindanone instead of 5,6-difluoro-2-methyl-1-indanone. Using the same conditions and techniques, there is obtained 5-methylthio-2-methylindene-3-acetic acid methyl ester.

When an acylamino or sulfamyl indanone is employed as the starting material in the above procedure, the corresponding methyl ester is obtained.

F. 5,6-Difluoro-2-methyl-1-(p-methylthiobenzylidene)-indene-3-acetic acid 1.19 G. (5.0 mmole) of 5,6-difluoro-2-methylindene-3-acetic acid ester is dissolved in 10 ml. of dry pyridine followed by 0.76 g. (5.0 mmole) of p-methylthiobenzaldehyde. The flask is placed under nitrogen and 5.0 g. (5.1 mmole) of Triton B is added. The deeply colored solution is allowed to stand overnight and then 2 ml. of water is added. After standing for 15 minutes it is poured into an excess of water. The organics are extracted with ether (2 × 50 ml.). The aqueous phase is added to 10% HCl-ice. The orange gummy solid which precipitates is extracted into methylene chloride and dried ($MgSO_4$). The solvent is removed to leave an orange solid. The solid is filtered to give a crude product which is recrystallized from benzene to give 5,6-difluoro-2-methyl-1-(p-methylthiobenzylidene)-indene-3-acetic acid, m.p. 181°–182.5°.

When 3-methylthio-2-furaldehyde or 2-methylthio-5-pyrazine aldehyde is utilized in the above procedure instead of p-methylthiobenzaldehyde the corresponding indene acetic acid is obtained.

When the appropriately substituted furans, thiophenes, pyroles, oxazoles, thiazoles, imidazoles, pyridines, pyridazines, pyrrimidine, pyrazine, piperazine or fused heterocyclic system is introduced according to the above procedure, the corresponding 1-(hetero)-indene-3-acetic acid is obtained.

G. 5,6-Difluoro-2-methyl-1-(p-methylsulfinylbenzylidene)-indene-3-acetic acid To a solution of 0.358 g. (1.0 mmole) of 5,6-difluoro-2-methyl-1-(p-methylthiobenzylidene)-indene-3-acetic acid in acetone (10 ml.) is added 10–15 ml. MeOH. With magnetic stirring 0.32 g. (1.5 mmole) of sodium meta periodate is added in 5 ml. of water. The proportions of acetone, methanol and water are adjusted if necessary in order to preserve homogeneity. After several minutes, a precipitation of sodium iodate appears. The suspension is stirred at room temperature for 16 hours and then poured into approximately 50 ml. of water and 100 ml. methylene chloride. The two phases are separated and extracted twice with methylene chloride. The organic layer is washed with water and dried ($MgSO_4$). The residue after evaporation is dissolved in the minimum amount of boiling ethyl acetate and allowed to stand for 12 hours in the freezer compartment. The deep orange crystals are filtered. The filtrate is reduced to one-half volume and allowed to stand in the cold for several hours to give a large second crop. In this way, 5,6-difluoro-2-methyl-1-(p-methylsulfinylbenzylidene)-3-indenylacetic acid is isolated, m.p. 209°–210°.

EXAMPLE 7

5,6-Difluoro-2-methyl-1-(p-methylsulfonylbenzylidene)-indene-3-acetic acid

To 5,6-difluoro-2-methyl-1-(p-methylsulfinylbenzylidene)-indene-3-acetic acid (0.005 mole) in acetone (15 ml.) is added, slowly with stirring, m-chloroperbenzoic acid (0.005 mole). The mixture is heated and evaporated to near dryness at 40°. The solid is leached with boiling water (4 × 50 ml.) and dried yielding 5,6-difluoro-2-methyl-1-(p-methylsulfonylbenzylidene)-indene-3-acetic acid, m.p. 228°–230°.

α-[1-(p-Methylsulfinylbenzylidene)-2-methyl-5,6-difluoro-3-indenyl]-propionic acid and α-[1-(p-methylsulfonylbenzylidene)-2-methyl-5,6-difluoro-3-indenyl]-propionic acid are prepared by the procedures of Examples 3A, B and C.

EXAMPLE 8

A. 3,4-Difluorobenzaldehyde

57 G. (0.5 mole) of ortho-difluorobenzene in 250 ml. of methylene chloride is added to 100 g. (0.75 mole) of anhydrous aluminum chloride. The mixture is stirred (motor) and cooled in an ice bath while 85.5 g. (0.75 mole) of dichloromethyl methylether is added dropwise. Vigorous HCl evolution takes place and the reaction mixture turns orange-red. After the addition the mixture is stirred at room temperature for 15 minutes and the liquid phase is decanted into 500 ml. of ice and water. The unreacted residue of aluminum chloride is washed with methylene chloride until colorless and the washings are added to the water. The mixture is shaken well in a separation funnel until the methylene chloride layer is green. The organic layer is washed with saturated potassium carbonate solution until neutral, then dried ($MgSO_4$) and distilled to give 3,4-difluorobenzaldehyde, b.p. 70°–74°/20 min. The dark residue in the distillation pot solidifies on cooling to give tris-(3,4-difluorophenyl)methane, m.p. 95°–96°.

3,4-Dimethylbenzaldehyde

The above reaction of Example 6A is repeated except that o-xylene and dichloromethyl methylether are the starting materials. Using the same reaction conditions and techniques, there is obtained 3,4-dimethylbenzaldehyde.

4-Mercaptobenzaldehyde

The above reaction of Example 6A is repeated except that the starting materials are mercaptobenzene and dichloromethyl methylether. Using the same reaction conditions and techniques, there is obtained 4-mercaptobenzaldehyde.

B. 5,6-Difluoro-2-methyl-1-(p-methylsulfinylbenzylidene)-3-indenyl acetic acid The reactions of Example 6B, 6C, 6D, 6E, 6F and 6G are repeated and 5,6-difluoro-2-methyl-1-(p-methylsulfinylbenzylidene)-3-indenyl acetic acid is obtained.

EXAMPLE 9

A. 3-Fluoro-4-methoxybenzaldehyde

To a solution of o-fluoroanisole, 101 g. (0.80 mole) in 500 ml. dry methylene chloride is added dropwise over 30 minutes a solution of titanium tetrachloride, 182 g. (0.96 mole, 1.2 equiv.) and α,α-dichloromethylmethyl ether, 110 g. (0.96 mole) in an equal volume of methylene chloride. The temperature is maintained at 10°–20C. with an ice-bath. The mixture is stirred at room temperature for 1 hour longer and then poured over crushed ice-water with stirring. Ether (1 l.) is added and the mixture stirred under nitrogen until solution occurs. The organic layer is extracted with water (3X), sodium bicarbonate solution (3X) and dried ($MgSO_4$). The solvent is evaporated off at 30° to give crude product as an oil. The oil is vacuum distilled through a jacketed Vigreux column when it gives 3-fluoro-4-methoxybenzalde-hyde, b.p. 120°–121°C. at 10 mm. Hg; $R_f$ 0.6 on a silica-gel G plate with methylene chloride.

B. 3-Fluoro-4-methoxy-α-methylcinnamic acid

A mixture of 3-fluoro-4-methoxybenzaldehyde, 34.2 g. (0.22 mole), propionic anhydride, 50 g. (0.38 mole) and sodium propionate, 21 g. (0.22 mole), is stirred under nitrogen at 150°C. for 15 hours. The reaction mixture is then poured into 1.3 l. of water with stirring and the product precipitated. 2.0 N potassium hydroxide solution (500 ml.) is added and the mixture stirred for several hours, until the acid has dissolved.

The aqueous solution is extracted with ether (3X) and then acidified with concentrated hydrochloric acid with stirring. The precipitated product is collected, washed thoroughly with water and dried in a vacuum oven at 50°C. over potassium hydroxide pellets to give 3-fluoro-α-methyl-4-methoxycinnamic acid, m.p. 167°–169°C.; $R_f$ 0.5 on silica gel G with methylene chloride-methanol (1:1).

C. 3-Fluoro-4-methoxy-αacid dihydrocinnamic acid

3-Fluoro-4-methoxy-α-methylcinnamic acid, 49.5 g. (0.236 mole) in 800 ml. methanol is hydrogenated at 43 lbs. pressure and room temperature until the theroretical uptake of hydrogen has occurred (24 min. at 20°C., using 1.5 g. platinum oxide catalyst). The solution is filtered and then evaporated with warming to 60° to give 3-fluoro-4-methoxy-α-methyl dihydrocinnamic acid, $R_f$ 0.5 on silica-gel G with methylene chloride-methanol (9:1).

D. 5-fluoro-6-methoxy-2-methylindanone

A mixture of 3-fluoro-α-methyl-4-methoxy dihydrocinnamic acid, 49.3 g. (0.23 mole) in 500 g. of polyphosphoric acid is heated at 95°C. on a steam bath with occasional agitation for 75 min. The dark red solution is poured into 3.0 l. of water and the mixture stirred overnight. The precipitated product is collected, washed thoroughly with water and then taken up in ether. The ether solution is extracted with aqueous potassium bicarbonate (4X), diluted with methylene chloride and dried (MgSO$_4$).

The organic solution is evaporated and recrystallized from methylene chloride-petroleum ether to give 5-fluoro-6-methoxy-2-methylindanone, (m.p. 76°–78°).

E. Methyl 6-fluoro-5-methoxy-2-methyl-3-indenylacetate

Into a 500 ml. three-necked flask fitted with mechanical stirrer, reflux condenser, drying tube, dropping funnel and nitrogen inlet is placed 8.0 g. zinc sheet and 100 ml. of dry benzene. A few milliliters of a solution of 21.3 g. (0.11 mole) of 5-fluoro-6-methoxy-2-methylindanone and 18.36 g. (0.121 mole) of methyl bromoacetate in 100 ml. of dry benzene is added at a time. A crystal of iodine is added. The mixture is gently heated with stirring. After the iodine color has disappeared, the remainder of the mixture is added gradually. The reaction is heated at reflux temperature for 18 hours. The mixture is poured onto 600 ml. of 5% H$_2$SO$_4$ and about 500 g. of ice. Some ether is added. The organic layer is separated and washed with three portions of 5% H$_2$SO$_4$, water, KHCO$_3$ solution and finally water again. The organic layer is dried (MgSO$_4$) and concentrated to give 27.6 g. of reddish oil which crystallizes upon standing. Thin-layer chromatography on silicagel G with methylene chloride methanol (99:1) shows product at $R_f$(0.5).

Without further purification, the hydroxy ester is dehydrated to the indenylacetate. In 200 ml. of dry benzene, 14.2 g. (53 mmole) of crude ester and 36 g. of phosphorus pentoxide are refluxed with stirring for one-half hour. After cooling, the reaction mixture is filtered and the solid residue washed well with benzene. The benzene filtrate is washed with two portions of salt water and dried (MgSO$_4$). The organic solution is concentrated and gives a slightly colored oil which rapidly crystallizes. The crude product is recrystallized from methylene chloride-petroleum ether to give methyl-6-fluoro-5-methoxy-2-methyl-3-indenylacetate (m.p. 61°–62°).

F. 6-Fluoro-5-methoxy-2-methyl-1-(p-methylthiobenzylidene)-3-indenylacetic acid To a solution of methyl-6-fluoro-5-methoxy-2-methyl-3-indenyl acetate, 9.3 g. (0.037 mole) and p-methylthiobenzoaldehyde, 6.3 g. (1.1 equivalent) is added 16 ml. (2.0 equivalents) of 25 percent methanolic sodium methoxide. The mixture is stirred at reflux under nitrogen for 2 hours. An equal volume of water is added dropwise and refluxing continues for 30 minutes. The solution is cooled, diluted with water and extracted with ether (3X). Residual ether is blown off with nitrogen and then the aqueous solution is acidified with 50 percent glacial acetic acid. The precipitated product is collected and washed thoroughly with water. The crude product is recrystallized from methanol to give 6-fluoro-5-methoxy-2-methyl-1-(p-methylthiobenzylidene)-3-indenylacetic acid, m.p. 172°–174°.

G. 6-Fluoro-5-methoxy-2-methyl-1-(p-methylsulfinylbenzylidene)-3-indenylacetic acid A solution of sodium periodate, 4.28 g. (20 mmole) in 40 ml. of water is added dropwise to 6-fluoro-5-methoxy-2-methyl-1-(p-methylthiobenzylidene)-3-indenylacetic acid, 3.70 g. (10 mmole) in 300 ml. methanol and enough acetone to cause solution. This solution is stirred overnight at room temperature and filtered. The filtrate is evaporated at 30° to a small volume which causes the product to precipitate. The suspension is diluted with several volumes of water, cooled and collected. After rinsing with water and cold methanol-water (1:1), the product is dried in vacuo over potassium hydroxide pellets and then in a vacuum oven at 70°C. The crude product is recrystallized from methylene chloride-petroleum ether to give 6-fluoro-5-methoxy-2-methyl-1-(p-methylsulfinylbenzylidene)-3-indenylacetic acid (m.p. 190°–193°).

6-Fluoro-5-methoxy-2-methyl-1-(p-methylsulfinylbenzylidene)-3-indenylacetic acid is prepared according to the procedure of Example 7 by the addition of 1.0 mole of m-chloroperbenzoic acid per mole of 6-fluoro-5-methoxy-2-methyl-1-(p-methylsulfinylbenzylidene)-3-indenyl acetic acid in an acetone solution.

α-[1-(p-Methylsulfinylbenzylidene)-2-methyl-5-fluoro-6-methoxy-3-indenyl]-propionic acid and α-[1-(p-methylsulfonylbenzylidene)-2-methyl-5-methoxy-6-fluoro-3-indenyl]-propionic acid are prepared by the procedures of Examples 3A, 3B and 3C.

EXAMPLE 10

A. p-Fluoro-α-methylcinnamic acid p-Fluorobenzaldehyde (200 g., 1.61 mole), propionic anhydride (3.5 g., 2.42 mole) and sodium propionate (155 g., 1.61 mole) are mixed in a 1 l. three-necked flask which had been flushed with nitrogen. The flask is heated gradually in an oil-bath to 140°. After 20 hours the flask is cooled to 100° and poured into 8 l. of water. The precipitate is dissolved by adding potassium hydroxide (302 g.) in 2 l. of water. The aqueous solution is extracted with ether, and the ether extracts washed with potassium hydroxide solution. The combined aqueous layers are filtered, acidified with concentrated HCl, filtered and the collected solid washed with water, thereby producing p- fluoro-α-methylcinnamic acid which is used as obtained.

B. p-Fluoro-α-methylhydrocinnamic acid

To p-fluoro-α-methylcinnamic acid (177.9 g., 0.987 mole) in 3.6 l. ethanol is added 11.0 g. of 5% Pd/C and the mixture reduced at room temperature under a hydro-gen pressure of 40 p.s.i. Uptake is 31/32 lbs. (97 percent of theoretical). After filtering the catalyst, the filtrate is concentrated in vacuo to give the product p-fluoro-α-methylhydrocinnamic acid used without weighing in next step.

C. 6-Fluoro-2-methylindanone

To 932 g. polyphosphoric acid at 70° on the steam bath is added p-fluoro-α-methylhydrocinnamic acid (93.2 g., 0.5 mole) slowly with stirring. The temperature is gradually raised to 95°C., and the mixture kept at this temperature for 1 hour. The mixture is allowed to cool and added to 2 l. of water. The aqueous layer is extracted with ether, the ether solution washed twice with saturated sodium chloride solution, 5% $Na_2CO_3$ solution, water, and then dried. The ether filtrate is concentrated with 200 g. silica-gel, and added to a five pound silica-gel column packed with 5 percent ether-petroleum ether. The column is eluted with 5–10 percent ether-petroleum ether and followed by tlc to give 6-fluoro-2-methylindanone.

D. 5-Fluoro-2-methylindene-3-acetic acid

A mixture of 6-fluoro-2-methylindanone (18.4 g., 0.112 mole), cyanacetic acid (10.5 g., 0.123 mole), acetic acid (6.6 g.), and ammonium acetate (1.7 g.) in dry toluene (15.5 ml.) is refluxed with stirring for 21 hours, as the liberated water is collected in a Dean Stark trap. The toluene is concentrated and the residue dissolved in 60 ml. of hot ethanol and 14 ml. of 2.2 N aqueous potassium hydroxide solution. 22 G. of 85% KOH in 150 ml. of water is added and the mixture refluxed for 13 hours under $N_2$. The ethanol is removed under vacuum, 500 ml. water added, the aqueous solution washed well with ether and then boiled with charcoal. The aqueous filtrate is acidified to pH 2 with 50 percent hydrochloric acid, cooled and the precipitate collected. In this way dried 5-fluoro-2-methylindenyl-3-acetic acid (m.p. 164°–166°) is obtained.

E. 5-Fluoro-2-methyl-1-(p-methylthiobenzylidene)3-indenyl-acetic acid

5-Fluoro-2-methyl-3-indenylacetic acid (15 g., 0.072 mole) p-methylthiobenzaldehyde (14.0 g., 0.091 mole) and sodium methoxide (13.0 g., 0.24 mole) are heated in methanol (200 ml.) at 60° under nitrogen with stirring for 6 hours. After cooling the reaction mixture is poured into 750 ml. of ice-water, acidified with 2.5 N hydrochloric acid and the collected solid triturated with a little ether to produce 5-fluoro-2-methyl-1-(p-methylthiobenzylidene)-3-indenylacetic acid (m.p. 187°–188.2°). U.V. in methanol λ max. 348 mµ. (E% 500), 258 (557), 258 (495), 353 (513), 262.5 (577), 242.5 (511).

F. 5-Fluoro-2-methyl-1-(p-methylsulfinylbenzylidene)-3-indenylacetic acid

To a solution of 5-fluoro-2-methyl-1-(p-methylthiobenzylidene)-3-indenylacetic acid (3.4 g., 0.01 mole) in a mixture of methanol (250 ml.) and acetone (100 ml.) is added a solution of sodium periodate (3.8 g., 0.018 mole) in water (50 ml.) with stirring.

Water (450 ml.) is added after 18 hours and the organic solvents removed under vacuum below 30°. The precipitated product is filtered, dried and recrystallized from ethyl acetate to give 5-fluoro-2-methyl-1-(p-methylsulfinylbenzylidene)-3-indenylacetic acid. Upon repeated recrystallization upon ethylacetate there is obtained cis-5-fluoro-2-methyl-1-(p-methylsulfinylbenzylidene)-3-indenylacetic acid, m.p. 184°–186°. U.V. in methanol; λmax. 328 (E% 377), 286, (432), 257.5 shldr. (413), 227 (548).

Further runs reveal the existence of a second polymorph of cis-5-fluoro-2-methyl-1-(p-methylsulfinylbenzylidene)-3-indenylacetic acid, m.p. 179°–181 °C.

5-Chloro-2-methyl-1-(p-methylsulfinylbenzylidene)-3-indenylacetic acid is prepared by the procedure as described above in Example 10.

5-Fluoro-2-methyl-1-(p-methylsulfonylbenzylidene)-3-indenylacetic acid is prepared according to the procedure of Example 7 by the addition of 1.0 mole of m-chloroperbenzoic acid per mole of 5-fluoro-2-methyl-1-(p-methylsulfinylbenzylidene)-3-indenylacetic acid in an acetone solution.

α-[1-(p-Methylsulfinylbenzylidene)-2-methyl-5-fluoro-3-indenyl]-propionic acid and α-[1-(p-methylsul-fonylbenzylidene)-2-methyl-5-fluoro-3-indenyl]-propionic acid are prepared by the procedures of Examples 3A, 3B, and 3C.

EXAMPLE 11

A. 2,4-Difluorobenzaldehyde

A 250 ml., three-necked flask is fitted with a stirrer, a thermometer, a dropping funnel with a long stem to the bottom of the flask and a reflux condenser with a tube leading to the back of the hood. 50 G. (0.38 mole) of 2,4-difluorotoluene is heated to reflux with stirring and irradiated with a Hanovia ultraviolet lamp. 41.5 ml. of bromine is gradually added. The reaction is completed in 2.5 hours during which time the reflux temperature rises from 112° to 155°.

A 2 l., three-necked flask is fitted with stirrer and reflux condenser. In the flask is placed 200 ml. of water and 140 g. calcium carbonate. The cooled above-described reaction mixture is transfered using some ether for rinsing. The hydrolysis is completed by refluxing with stirring for 18 hours. The aldehyde is isolated by steam distillation from the reaction flask. The oil is separated and the aqueous phase is extracted once with ether. The combined oil and ether extract is dried over anhydrous $MgSO_4$ and concentrated under reduced pressure to leave 2,4-difluorobenzaldehyde still containing some ether which is distilled through a short Vigreux column under reduced pressure and separated into several fractions. These are combined to give 2,4 - difluorobenzaldehyde, b.p. 56°–58°/12 mm.

B. 2,4-Difluoro-α-methylcinnamic acid

A 500 ml., three-necked flask is fitted with reflux condenser, drying tube, stirrer and $N_2$ inlet. To a mixture of 55.4 g. (0.39 mole) of 2,4-difluorobenzaldehyde and 56 ml. of propionic anhydride is added 38 g. (0.39 mole) of sodium propionate. The reaction mixture is heated at 135°–140° (oil bath temp.) for 19 hours with stirring under nitrogen. The still warm solution is poured into 1 l. of water with stirring. A solid separates which upon adding 56 g. of potassium hydroxide dissolves. The solution is extracted with ether and then heated on the steam bath to remove the ether. After cooling in an ice-bath, concentrated hydrochloric acid is added with stirring. The product which separates is collected and washed with cold water. After drying at 60° over KOH 2,4-difluoro-α-methylcinnamic acid, m.p. 126°–128° is obtained.

C. 2,4-Difluoro-α-methyldihydrocinnamic acid

In 800 ml. of methanol, 60 g. (0.3 mole) of 2,4-difluoro-α-methylcinnamic acid with 1.5 g. of platinum oxide catalyst is shaken under an initial pressure of 42 lbs. of hydrogen until one equivalent of hydrogen is absorbed. The reaction time is 30 minutes. The catalyst is removed by filtration and washed with methanol. The methanol, when evaporated off, leaves near colorless 2,4-difluoro-α-methyldihydrocinnamic acid as an oil which is used in the next step without further purification.

D. 4,6-Difluoro-2-methylindanone

A solution of 2,4-difluoro-α-methyldihydrocinnamic acid, 54.8 g. (0.274 mole) in 125 ml. thionyl chloride is stirred for 90 minutes and then at reflux for 90 minutes longer. The reaction solution is evaporated under reduced pressure leaving the acid chloride product as an oil.

To a suspension of ice-bath cooled anhydrous powdered aluminum chloride, 60 g. (0.45 mole), in 250 ml. of dry carbon disulfide is added dropwise over 10 minutes, a solution of the acid chloride, 60 g., in 100 ml. carbon disulfide. After the addition the ice bath is removed and the temperature raised slowly to room temperature. The mixture is stirred at room temperature for 20 hours and then is poured into 2 l. of 10 percent aqueous hydrochloric acid - crushed ice with stirring. Ether is added and the stirring continued until everything dissolves. The ether layer is extracted with 5 percent hydrochloric acid (2X), water (2X), and sodium bicarbonate solution (2X), when it is diluted with methylene chloride and dried ($MgSO_4$). The filtered solution is evaporated with warming to 70°C. to give the crude 4,6-difluoro-α-methylindanone as an oil which crystallizes on standing. The crude product is purified by chromatography of a column (7.0 × 35 cm.) of silica-gel, 400 g. of J.T. Baker 3405 packed in petroleum ether-methylene chloride (2:1). The column is developed and eluted with the same solvent system and upon recrystallization from methylene chloride-petroleum ether gives 4,6-difluoro-2-methylindanone, m.p. 68°–69°C.

E. Methyl 5,7-difluoro-2-methylindenyl-3-acetate

About 20 percent of a solution containing 4,6-difluoro-2-methylindanone, 15.0 g. (83 mmole), and methyl bromoacetate, 14.0 g. (1.1 equiv.) in 100 ml. dry benzene is added to a stirred suspension of powdered zinc dust (Merck dried 120°/20 mm.), 6.5 g. (1.2 equiv.) in 74 ml. dry benzene under a nitrogen atmosphere. Several crystals of iodine are added and the mixture slowly brought to reflux. The remainder of the solution is added dropwise over 10 minutes and the mixture stirred at reflux overnight, i.e., 17 hours. The reaction is cooled to room temperature, the mixture poured into 2.0 l. of 20 percent aqueous sulfuric acid - crushed ice with stirring, and ether added until a clear solution is obtained. The ether layer is extracted with 5% aqueous sulfuric acid (3X), water (3X), diluted with methylene chloride and dried ($MgSO_4$). The filtered ethereal solution is evaporated to give crude hydroxy ester.

Powdered phosphorus pentoxide (60.0 g.) is added to the hydroxy ester (20.0 g.) in 400 ml. of dry benzene. The mixture is stirred at reflux for 30 minutes and the clear benzene solution decanted. The residue is rinsed with benzene and then with ether. The combined organic solutions are diluted with ether, extracted six times with aqueous sodium sulfate solution, twice with aqueous potassium bicarbonate solution, diluted with methylene chloride and dried ($MgSO_4$). The crude indenyl acetate product is obtained by evaporation of the filtered elution to give an oil. The product is crystallized from petroleum ether and gives methyl 5,7-difluoro-2-methylindenyl-3-acetate, m.p. 69°–70°C.

F. 5,7-Difluoro-2-methyl-1-(p-methylthiobenzylidene)-3-indenylacetic acid, a mixture of geometric isomers Powdered sodium methoxide, 2.2 g. (40 mmole) is added to a suspension of methyl 5,7-difluoro-2-methylindenyl-3-acetate (4.78 g.) (20 mmole) and p-methylthiobenzaldehyde, 3.35 g. (22 mmole), in 40 ml. dry methanol under nitrogen. A clear solution results which is refluxed for 60 minutes. An equal volume of water is added and refluxing continued under nitrogen for 30 minutes to complete saponification. The solution is diluted with several volumes of water and extracted with ether. Nitrogen is bubbled through the aqueous solution to remove the residual ether solvent. Fifty percent aqueous acetic acid (40 ml.) is used to precipitate the product. The product is collected and washed well with water then it is dried in a desiccator over potassium hydroxide pellets and finally in the oven at 100°. The crude product is recrystallized from methylene chloride-petroleum ether and gives the cis and trans mixture of acids, m.p. 164°–173° in a 1:3 ratio, identifiable by integrating the 2-$CH_3$ signal in the N.M.R. spectra at 7.82γ for cis and 8.20γ for trans.

G. Cis-methyl-5,7-difluoro-2-methyl-1-(p-methylthiobenzylidene)-3-indenylacetate isolation by column chromatography Four drops of concentrated sulfuric acid is added to a solution of 5,7-difluoro-2-methyl-1-(p-methylthiobenzylidene)-3-indenylacetic acid, 1.0 g. (2.8 mmole) in 60 ml. of dry methanol and the solution stirred at reflux overnight. The solution is cooled and crystals separated which are collected, rinsed with cold methanol-water (1:1) and dried over potassium hydroxide pellets. These crystals are found to be ca. 95 percent of the trans-isomer and could be further purified by recrystallizing from methanol giving the trans-isomer, m.p. 106°–106.5°C. Powdered potassium bicarbonate is added to the filtrate from the first crop of crystals, followed by water. A second crop of mixed ester is obtained in this way which is cis-enriched and used for chromatography.

1.7 G. of cis and trans-mixed esters are chromatographed on a column (3.0 × 90 cm.) of silica-gel, 250 g. of J.T. Baker 3405, packed in methylene chloride-petroleum ether (1:9). The column is developed and eluted with a 1:4 ratio of the same solvents. 0.3 to 0.4 l. cuts are taken as the yellow bands are eluted. In this way the trans-isomer and the cis-isomer (m.p. 94°–95°) are obtained; U.V. of trans in MeOH λmax. 217 m$\mu$., 256 and 362 m$\mu$; U.V. of cis-isomer in MeOH λ max. 218 m$\mu$., 260 and 357 m$\mu$.

Cis-Cis.-5,7-difluoro-2-methyl-1-(p-methylthiobenzylidene)-3-indenylacetic acid 1.0 N aqueous sodium hydroxide 3.0 ml. (3.0 mmole) is added to cis -methyl 5,7-difluoro-2-methyl-1-(p-methylthiobenzylidene)-3-indenylacetate, 250 mg. (0.64 mmole) in 20 ml. methanol under nitrogen. The mixture is refluxed for 1 hour, cooled, diluted with water and acidified with several ml. of 50 percent acetic acid. Crystals form and after further chilling in ice bath they are collected, worked thoroughly with water and sucked nearly dry. The product is recrystallized from methanol-water, dried over potassium hydroxide pellets in vacuum dessicator and finally in a vacuum oven at 100°. In this way cis-5,7-difluoro-2-methyl-1-(p-methylthiobenzylidene)-3-indenylacetic acid (m.p. 182°–184°) is obtained.

I. Cis-5,7-difluoro-2-methyl-1-(p-methylsulfinylbenzylidene)-3-indenylacetic acid Sodium periodate 214 mg. (1.0 mmole) in 2 ml. water is added to cis-5,7-difluoro-2-methyl-1-(p-methylthiobenzylidene)-3-indenylacetic acid, 170 mg. (0.475 mmole) in 12 ml. of methanol and ca. 0.5 ml. acetone at room temperature. The mixture is stirred overnight when inspection of the tlc on silica-gel G using methylene chloride-methanol elution (1:1) shows that there is not starting material present but a trace of sulfone at $R_f$ 0.55. The reaction mixture is filtered and concentrated to a small volume without heating and diluted with water. The product is collected, rinsed with water and dried over potassium hydroxide pellets in a vacuum dessicator and finally in the oven dessicator at 80°. The product is recrystallized from ethyl acetate-petroleum ether and gives pure cis-5,7-difluoro-2-methyl-1-(p-methylsulfinylbenzylidene)-3-indenylacetic acid, m.p. 188°–189°C.

EXAMPLE 12

A. Cis-methyl-5,6-difluoro-2-methyl-1-(p-methylthiobenzylidene)-3-indenylacetate Four drops of concentrated sulfuric acid is added to a solution of 5,6-difluoro-2-methyl-1-(p-methylthiobenzylidene)-3-indenylacetic acid, 1.0 g. (2.8 mmole) in 60 ml. of dry methanol and the solution stirred at reflux overnight. The solution is cooled and crystals separated. Powdered potassium bicarbonate and water are added to the filtrate. The cis and trans-mixed esters are chromatographed on a column (3.0 × 90 cm.) of silica-gel, 250 g. of J.T. Baker 3405, packed in methylene chloride-petroleum ether (1.9). The column is developed and eluted with a 1:4 ratio of the same solvents. 0.3 to 0.4 l. cuts are taken as the yellow bands are eluted. In this way the trans-isomer and the cis-isomer are obtained.

B. Cis-5,6-difluoro-2-methyl-1-(p-methylsulfinylbenzylidene)-3-indenylacetic acid Cis-methyl-5,6-difluoro-2-methyl-1-(p-methylthiobenzylidene)-3-indenylacetate is reacted with sodium hydroxide according to the procedure of Example 11H and the resultant cis-5,6-difluoro-2-methyl-1-(p-methylthiobenzylidene)-3-indenylacetic acid is oxidized with sodium periodate according to the procedure of Example 11I to produce cis-5,6-difluoro-2-methyl-1-(p-methylsulfinylbenzylidene)-3-indenylacetic acid.

Cis-5,6-difluoro-2-methyl-1-(p-methylsulfonylbenzylidene)-3-indenylacetic acid is prepared by reacting cis-5,6-difluoro-2-methyl-1-(p-methylsulfinylbenzylidene)-3-indenylacetic acid with m-chloroperbenzoic acid according to the procedure of Example 7.

EXAMPLE 13

5-Fluoro-2-methyl-1-(p-methylsulfinylbenzylidene)-3-indenylacetmorpholide

A mixture of 5-fluoro-2-methyl-1-(p-methylsulfinylbenzylidene)-3-indenylacetic acid (0.01 mole) and thionyl chloride (0.03 mole) in a dried flask, condenser and drying tube set-up is heated on the steam bath until evolution of gas ceases. Excess thionyl chloride is then removed in vacuo, the residue taken up in a slight excess of anhydrous ether and added slowly to a vigorously stirred, ice-cooled solution of dry morpholine (0.035 mole) in 100 ml. of ether. The mixture is stirred overnight at room temperature, filtered, the morpholine hydrochloride washed with excess ether, and the combined ether filtrates washed with 2 × 100 ml. water, dried over anhydrous sodium sulfate, filtered, and the ether removed in vacuo. Chromatography of the crude product on a silica-gel column, using v./v. 50–100 percent ether in petroleum ether as eluent gives the desired morpholide.

Similarly, when morpholine is replaced by an equivalent amount of the following amines, the corresponding amides are obtained.

Dimethylamine
Ethanolamine
Benzylamine
N,N-diethylethylenediamine
Benzylglycinate
Piperidine
Pyrrolidine
N-methylpiperazine
N-phenylpiperazine
N-hydroxyethylpiperazine
Piperazine
Diethylamine Diethanolamine
Aniline
p-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethyl-glycine amide
N,N-dibutylglycine amide
N-methyl-2-aminomethylpiperidine
N-methyl-2-aminomethylpyrrolidine
β-Ethoxyethylamine
Di(β-ethoxyethyl)amine
β-Phenethylamine
α-Phenethylamine
Dibenzylamine
D-mannosamine

EXAMPLE 14

Esters of 5-fluoro-2-methyl-1-(p-methylsulfinylbenzylidene)-3-indenylacetic acid (A) Simple Esters - A mixture of 0.1 mole of 5-fluoro-2-methyl-1-(p-methylsulfinylbenzylidene)-3-indenylacetic acid, 0.2 g. of p-toluene sulfonic acid, 100 ml. of absolute ethanol and 75 ml. of dry benzene is refluxed on a steam bath while slowly distilling the solvent. After 17 hours the residual solvent is removed under reduced pressure. The residue is slurried in aqueous sodium bicarbonate and then with water until neutral. The resulting ethyl ester may be recrystallized from organic solvents such as ethyl acetate, benzene and the like. When methanol, propanol, t-butanol and benzyl alcohol are used instead of the ethanol in the above procedure, there is obtained the corresponding methyl, propyl, t-butyl and benzyl esters.

(B) Alkoxyalkyl Esters — Chloromethyl methyl ether (0.055 mole) is added to a suspension of 5-fluoro-2-methyl-1-(p-methylsulfinylbenzylidene)-3-indenylacetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60 percent ether by volume) as the eluent, to give methoxymethyl 5-fluoro-2-methyl-1-(p-methylsulfinylbenzylidene)-3-indenylacetate.

(C) Dialkylaminoalkyl Esters — A solution of 0.0054 mole of N,N'-dicyclohexylcarbodiimide in 6 ml. of anhydrous tetrahydrofuran is added to a solution of 5-fluoro-2-methyl-1-(p-methylsulfinylbenzylidene)-3-indenylacetic acid (0.005 mole) and 2-diethylaminoethanol (0.0054 mole) in 17 ml. of anhydrous tetrahydrofuran. The mixture is stirred at ambient temperature overnight. The dicyclohexylurea is removed by filtration and 2 ml. of glacial acetic acid is added to the filtrate. After the mixture has stood for one hour, it is filtered and 200 ml. of ether is added to the filtrate. The solution is then extracted three times with 100 ml. of 2.5 N HCl and the extracts are combined, washed twice with 100 ml. of ether, ice-cooled, made slightly alkaline with concentrated $NH_4OH$ and extracted three times with 100 ml. of ether. The ether extracts are combined, washed ten times with 100 ml. of water to remove traces of starting amine, dried over anhydrous potassium carbonate, filtered, and evaporated in vacuo. The oily residue is B-diethylaminoethyl 5-fluoro-2-methyl-1-(p-methylsulfinylbenzylidene)-3-indenylacetate.

When 2-dimethylaminoethanol, 3-dimethylamino-1-propanol, 3-diethylamino-1-propanol, N-β-hydroxyethylpiperidine, N-β-hydroxyethylpyrrolidine, N-hydroxymethylpyrrolidine, N-methyl-2-hydroxymethylpyrrolidine, N-ethyl-2-hydroxymethylpiperidine, 1-β-hydroxyethyl-4'-methylpiperazine or N-β-hydroxyethyl morpholine is used in the above procedure in place of 2-diethylaminoethanol, the corresponding β-dimethylaminoethyl, γ-dimethylaminopropyl, γ-diethylaminopropyl, β-N-piperidinylethyl, β-N-pyrrolidinylethyl, N-pyrrolidinylmethyl, 2'-(1'-methylpyrrolidinylmethyl), 4-methyl-1-piperazinylethyl, N-ethyl-2-piperidinylethyl and N-morpholinylethyl esters are obtained.

(D) Phenyl 5-fluoro-2-methyl-1-(p-methylsulfinylbenzylidenyl)-3-indenylacetate — A solution of 0.0054 mole of N,N'-dicyclohexylcarbodiimide in 6 ml. of anhydrous tetrahydrofuran is added to a solution of 5-fluoro-2-methyl-1-(p-methylsulfinylbenzylidenyl)-3-indenylacetic acid (0.005 mole) and phenol (0.0054 mole) in 17 ml. of anhydrous tetrahydrofuran. The mixture is shaken vigorously and allowed to sit, stoppered, at room temperature overnight.

After filtering off the N,N'-dicyclohexylurea, 2 ml. of glacial acetic acid is added to the filtrate and the mixture allowed to stand 1 hour. After filtering, 200 ml. ether is added to the filtrate and the ether solution washed with 2 × 100 ml. saturated sodium bicarbonate solution and 3 × 100 ml. water and then dried over anhydrous sodium sulfate. The mixture is filtered, concentrated in vacuo to 25 ml. and chromatographed on a 150 g. acid washed alumina column using ether-petroleum ether (v./v. 10–60 percent) as eluent to give phenyl 5-fluoro-2-methyl-1-(p-methylsulfinylbenzylidenyl)-3-indenylacetate.

Similarly, using 2-(2-methoxyethoxy)-ethanol, glycol or N-acetyl-ethanolamine in place of phenyl in the above procedure gives 2-(2-methoxyethoxy)-ethyl 5-fluoro-2-methyl-1-(p-methylsulfinylbenzylidenyl)-3-indenylacetate, β-hydroxyethyl 5-fluoro-2-methyl-1-(p-methylsulfinylbenzylidenyl)-3-indenylacetate and β-acetamidoethyl 5-fluoro-2-methyl-1-(p-methylsulfinylbenzylidenyl)-3-indenylacetate, respectively.

A mixture of 0.06 mole of sodium 5,6-difluoro-2-methyl-1-(p-methylsulfinylbenzylidene)-3-indenylacetate and 0.05 mole of trityl bromide in 100 ml. anhydrous benzene is refluxed with rapid stirring under nitrogen for 5 hours. The hot reaction mixture is filtered and the filtrate is concentrated in vacuo. The residual oil is recrystallized from methyl ethyl ketone to give trityl 5,6-difluoro-2-methyl-1-(p-methylsulfinylbenzylidene)-3-indenylacetate.

Similarly the phenyl or trityl esters of 5-fluoro-2-methyl-1-(p-methylsulfinylbenzylidene)-3-indenyl acetic acid or any of the other 3-indenyl acids described in other examples are used in place of the above-described acid in any of the above preparations, the corresponding esters are obtained.

EXAMPLE 15

N-[5-fluoro-2-methyl-1-(p-methylsulfinylbenzylidene)-3-indenylacetyl]-glycine (A) Benzyl-N-[5-fluoro-2-methyl-1-(p-methylsulfinylbenzylidene)-3-indenylacetyl]-glycinate — The procedure of Example 14 is followed using benzylamino acetate in place of the morpholine to produce the above-named compound. (B) N-[5-fluoro-2-methyl-1-(p-methylsulfinyl-benzylidene)-3-indenylacetyl]-glycine - Benzyl-n-[5-fluoro-2-methyl-1-(p-methylsulfinylbenzylidene)-3-indenylacetyl]-glycinate (0.003 mole) in a mixture of 25 ml. of anhydrous ethanol and 2.5 ml. of 1 N sodium hydroxide is allowed to stand at room temperature for 18 hours. The solution is diluted with water and extracted with ether. The aqueous layer is acidified with dilute hydrochloric acid and the organic product is extracted with ethyl acetate, washed with water and dried over sodium sulfate. Evaporation of the solution gives N-[5-fluoro-2-methyl-1-(p-methylsulfinylbenzylidene)-3-indenylacetyl]-glycine.

When any of the other 1-aralkylidene-3-indenyl aliphatic acids described in the other examples of these specifications are used in the above procedure in place of the 5-fluoro-2-methyl-1-(p-methylsulfinylbenzylidene)-3-indenylacetic acid, the corresponding indenyl acyl glycine is obtained.

EXAMPLE 16

A. Sodium 5-fluoro-2-methyl-1-(p-methylsulfinylbenzylidene)-3-indenylacetate

5-Fluoro-2-methyl-1-(p-methylsulfinylbenzylidene)-3-indenylacetic acid (1.79 g.) in methanol (10 ml.) is added to a solution of sodium methoxide (0.27 g.) in methanol (5 ml.). The reaction mixture is stirred for 20 minutes and evaporated to dryness to yield sodium 5-fluoro-2-methyl-1-(p-methylsulfinylbenzylidene)-3-indenylacetate.

B. Calcium 5-fluoro-2-methyl-1-(p-methylsulfinylbenzylidene)-3-indenylacetate

The above reaction is repeated using 2 moles of acid per mole of calcium methoxide. Using the same reaction conditions and techniques there is obtained calcium 5-fluoro-2-methyl-1-(p-methylsulfinylbenzylidene)-3-indenylacetate.

EXAMPLE 17

A mixture of 250 parts of 5-fluoro-2-methyl-1-(p-methylsulfinylbenzylidene)-3-indenylacetic acid and 25 parts of lactose is granulated with suitable water and to this is added 100 parts of maize starch. The mass is passed through a 16-mesh screen. The granules are dried at a temperature below 60°C. The dry granules are passed through a 16-mesh screen and mixed with 3.8 parts of magnesium stearate. They are then compressed into tablets suitable for oral administration according to the method of this invention.

What is claimed is:

1. A method of treating pain, fever or inflamation which comprises administering to a host a therapeutically effective amount of a compound.

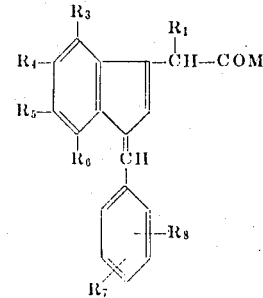

wherein:
$R_1$ is hydrogen, loweralkyl or halogenated loweralkyl;
$R_2$ is hydrogen or alkyl;
$R_3$, $R_4$, $R_5$ and $R_6$ each are hydrogen, loweralkyl, loweralkoxy, nitro, amino, loweralkylamino, lowerdialkylamino, lowerdialkylaminoloweralkyl, sulfamyl, loweralkylthio, mercapto, hydroxy, hydroxyloweralkyl, loweralkylsulfonyl, cyano, halogen, carboxyl, carbloweralkyl, carbamido, halogenoalkyl, cycloalkyl, or cycloalkoxy;
$R_7$ is alkylsulfinyl or alkylsulfonyl;
$R_8$ is hydrogen, ahalogen, hydroxy, alkoxy or haloalkyl; and
M is hydroxy, loweralkoxy, benzyloxy, phenoxy, or the group OMe wherein
Me is alkali metal or alkali earth metal.

2. A method of treating pain, fever, or inflamation in accordance with the method of claim 1 wherein the compound is of the formula:

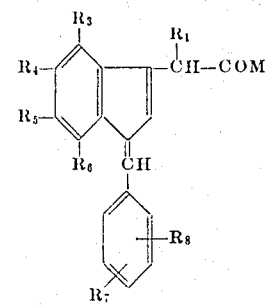

wherein:
$R_1$ is hydrogen, loweralkyl, or haloloweralkyl;
$R_2$ is hydrogen or loweralkyl;
$R_3$ is hydrogen;
$R_4$ is hydrogen, halogen, loweralkoxy, amino, loweralkylamino or diloweralkylamino;
$R_5$ is hydrogen, halogen, loweralkoxy, amino, loweralkylamino, or diloweralkylamino;
$R_6$ is hydrogen, halogen, loweralkoxy, amino, loweralkylamino or diloweralkylamino;
$R_7$ is loweralkylsulfinyl or loweralkylsulfonyl;
$R_8$ is hydrogen, halogen, hydroxy, loweralkoxy, loweralkyl or haloloweralkyl; and
M is hydroxy, loweralkoxy, benzyloxy, phenoxy, or the group OMe wherein
Me is alkali metal or alkali earth metal.

3. A method of treating pain, fever, or inflamation in accordance with the method of claim 1 wherein the compound is of the formula:

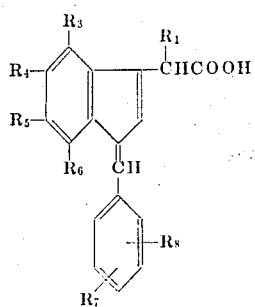

wherein:
R₁ is hydrogen or loweralkyl;
R₂ is loweralkyl;
R₃ is hydrogen;
R₄ is halogen, loweralkyoxy, or diloweralkylamino;
R₅ is hydrogen, halogen, loweralkoxy or diloweralkylamino;
R₆ is hydrogen, halogen, loweralkoxy or diloweralkylamino;
R₇ is loweralkylsulfinyl or loweralkylsulfonyl; and
R₈ is hydrogen.

4. The method of claim 1 wherein the compound is 5,6-difluoro-2-methyl-1-(p-methylsulfinylbenzylidene)-3-indene acetic acid.

5. The method of claim 1 wherein the compound is 5-fluoro-2-methyl-1-(p-methylsulfinylbenzylidene)-3-indene acetic acid.

6. The method of claim 1 wherein the compound is α-[5-fluoro-2-methyl-1-(p-methylsulfinylbenzylidene)-3-indenyl]-propionic acid.

7. The method of claim 1 wherein the compound is 5,7-difluoro-2-methyl-1-(p-methylsulfinylbenzylidene)-3-indene acetic acid.

8. The method of claim 1 wherein the compound is 5-chloro-2-methyl-1-(p-methylsulfinylbenzylidene)-3-indene acetic acid.

9. The method of claim 1 wherein the compound is 6-fluoro-5-methoxy-2-methyl-1-(p-methylsulfinylbenzylidene)-3-indene acetic acid.

10. A method of treating pain, fever, or inflamation which comprises administering to a host a therapeutically effective amount of cis-5-fluoro-2-methyl-1-(p-methylsulfinylbenzylidene)-3-indene acetic acid.

11. A pharmaceutical composition for the treatment of pain, fever or inflammation comprising an effective amount of a compound of the formula

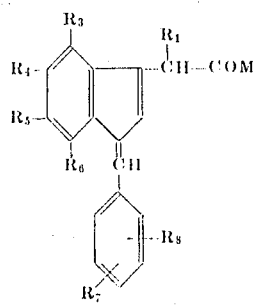

wherein:
R₁ is hydrogen, loweralkyl or halogenated loweralkyl;
R₂ is hydrogen or alkyl;
R₃, R₄, R₅ and R₆ each are hydrogen, loweralkyl, loweralkoxy, nitro, amino, loweralkylamino, lowerdialkylamino, lowerdialkylaminoloweralkyl, sulfamyl, loweralkylthio, mercapto, hydroxy, hydroxyloweralkyl, loweralkylsulfonyl, halogen, carboxyl, carbloweralkoxy, carbamido, halogenoalkyl, cycloalkyl, or cycloalkoxy;
R₇ is alkylsulfinyl or alkylsulfonyl;
R₈ is hydrogen, halogen, hydroxy, alkoxy or haloalkyl; and
M is hydroxy, loweralkoxy, benzyloxy, phenoxy, or the group OMe wherein
Me is alkali metal or alkali earth metal and a pharmaceutically acceptable carrier therefore.

12. A pharmaceutical composition as in claim 11 wherein the active ingredient is a compound selected from the formula:

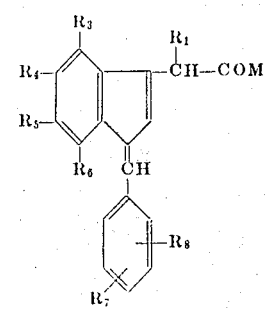

wherein:
R₁ is hydrogen, loweralkyl, or haloloweralkyl;
R₂ is hydrogen or loweralkyl;
R₃ is hydrogen;
R₄ is hydrogen, halogen, loweralkoxy, amino, loweralkylamino or diloweralkylamino;
R₅ is hydrogen, halogen, loweralkoxy, amino, loweralkylamino, or diloweralkylamino;
R₆ is hydrogen, halogen, loweralkoxy, amino, loweralkylamino or diloweralkylamino;
R₇ is loweralkylsulfinyl or loweralkylsulfonyl;
R₈ is hydrogen, halogen, hydroxy, loweralkoxy, loweralkyl or haloloweralkyl; and
M is hydroxy, loweralkoxy, benzyloxy, phenoxy, or the group OMe wherein
Me is alkali metal or alkali earth metal.

13. A pharmaceutical composition as in claim 12 wherein the active ingredient is a compound of the formula:

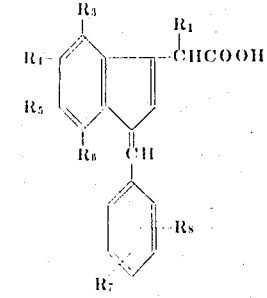

wherein:
R₁ is hydrogen or loweralkyl;
R₂ is loweralkyl;
R₃ is hydrogen;
R₄ is halogen, loweralkoxy, or diloweralkylamino;
R₅ is hydrogen, halogen, loweralkoxy or diloweralkylamino;

$R_6$ is hydrogen, halogen, loweralkoxy or diloweralkylamino;
$R_7$ is loweralkylsulfinyl or loweralkylsulfonyl; and
$R_8$ is hydrogen.

14. A pharmaceutical composition as in claim 13 wherein the compound is 5,6-difluoro-2-methyl-1-(p-methylsulfinylbenzylidene)-3-indene acetic acid.

15. A pharmaceutical composition as in claim 14 wherein the compound is 5-fluoro-2-methyl-1-(p-methylsulfinyl-benzylidene)-3-indene acetic acid.

16. A pharmaceutical composition as in claim 15 wherein the compound is α-[5-fluoro-2-methyl-1-(p-methylsulfinylbenzylidene)-3-indenyl]-propionic acid.

17. A pharmaceutical composition as in claim 16 wherein the compound is 5,7-difluoro-2-methyl-1-(p-methylsulfinylbenzylidene)-3-indene acetic acid.

18. A pharmaceutical composition as in claim 17 wherein the compound is 5-chloro-2-methyl-1-(p-methylsulfinylbenzylidene)-3-indene acetic acid.

19. A pharmaceutical composition as in claim 18 wherein the compound is 6-fluoro-5-methoxy-2-methyl-1-(p-methylsulfinylbenzylidene)-3-indene acetic acid.

20. A pharmaceutical composition comprising a pharmaceutically acceptable carrier and cis-5-fluoro-2-methyl-1-(p-methylsulfinylbenzylidene)-3-indene acetic acid.

* * * * *

UNITED STATES PATENT OFFICE
CERTIFICATE OF CORRECTION

Patent No. 3,725,548          Dated April 3, 1973

Inventor(s) Shen, Greenwald, Jones, Linn and Witzel

It is certified that error appears in the above-identified patent and that said Letters Patent are hereby corrected as shown below:

Column 5, line 3, the first word in the line which is "and" should be "the".

Column 6, line 38, the "$R_4$" group is missing.

Column 6, line 52 which reads:

"20°-120bL in ether, benzene, toluene, xylene, etc."

should read:

"20-120° in ether, benzene, toluene, xylene, etc."

Column 7, the formula appearing in brackets which reads as follows:

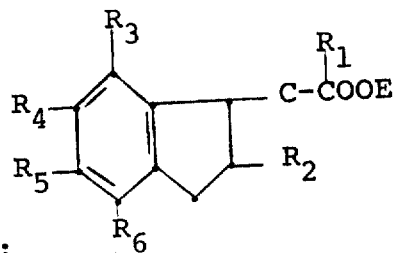

should be:

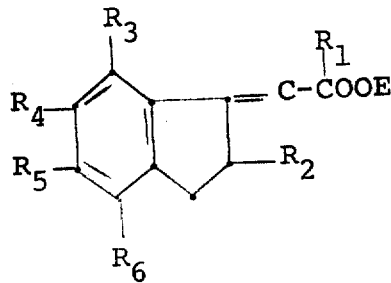

UNITED STATES PATENT OFFICE
CERTIFICATE OF CORRECTION

Patent No. 3,725,548        Dated April 3, 1973

Inventor(s) Shen, Greenwald, Jones, Linn and Witzel

It is certified that error appears in the above-identified patent and that said Letters Patent are hereby corrected as shown below:

PAGE 2

Column 7, between lines 25-30, the formula on the left hand side which reads:

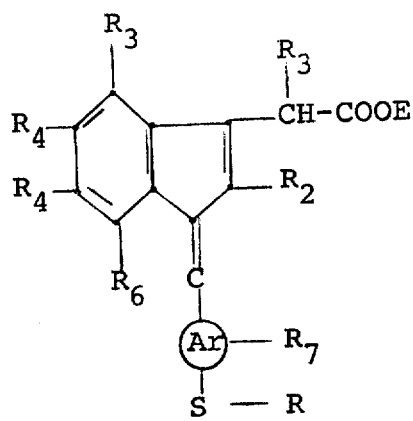

should read as follows:

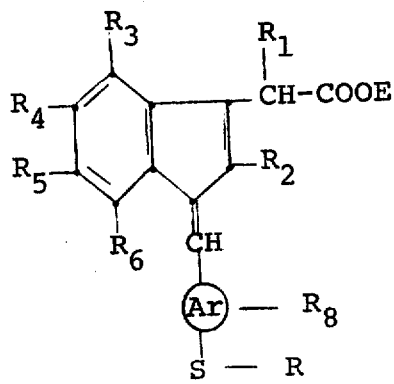

UNITED STATES PATENT OFFICE
CERTIFICATE OF CORRECTION

Patent No. 3,725,548     Dated April 3, 1973

Inventor(s) Shen, Greenwald, Jones, Linn and Witzel

It is certified that error appears in the above-identified patent and that said Letters Patent are hereby corrected as shown below:

PAGE 3

Column 8, line 42, "α-aryl" should be "β-aryl".

Column 12, line 50, which reads:

"to give pure 1-p-methylthiobenzylidene15-"

should be:

"to give pure 1-p-methylthiobenzylidene-5-"

Column 17, line 1, which reads:

"C. 3-Fluoro-4-methoxy-αacid dihydrocinnamic acid"

should be:

"C. 3-Fluoro-4-methoxy-α-methyl dihydrocinnamic acid"

Column 18, line 39, "(p-methylsulfinyl-" should be "(p-methylsulfonyl-"

Column 23, line 23, which reads:

"Cis-Cis-5,7-difluoro-2-methyl-1-(p-"

should read:

"H-Cis-5,7-difluoro-2-methyl-1-(p-"

Column , line 18, "Benzyl-n" should be "Benzyl-N"

UNITED STATES PATENT OFFICE
CERTIFICATE OF CORRECTION

Patent No. 3,725,548　　　　　Dated　April 3, 1973

Inventor(s)　Shen, Greenwald, Jones, Linn and Witzel

It is certified that error appears in the above-identified patent and that said Letters Patent are hereby corrected as shown below:

PAGE 4

Column 28, the formula appearing in Claim 1 which reads:

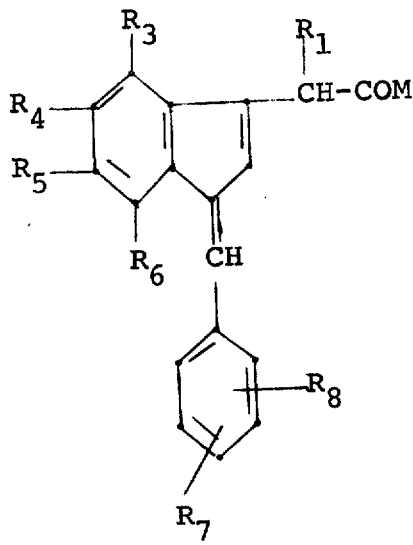

should be:

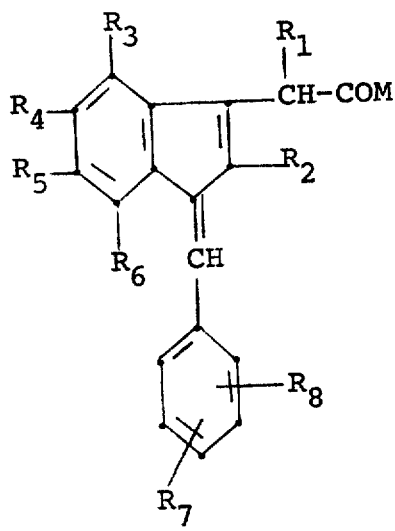

UNITED STATES PATENT OFFICE
CERTIFICATE OF CORRECTION

Patent No. 3,725,548    Dated April 3, 1973

Inventor(s) Shen, Greenwald, Jones, Linn and Witzel

It is certified that error appears in the above-identified patent and that said Letters Patent are hereby corrected as shown below:

PAGE 5

Column 28, line 26, "carbloweralkyl" should be "carbloweralkoxy".

Column 28, line 29, "ahalogen" should be "halogen".

Column 28, the formula appearing in Claim 2 which reads:

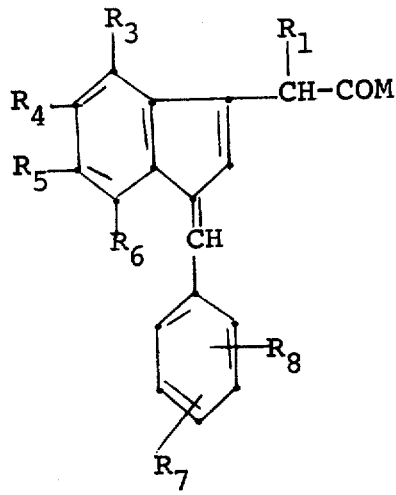

should be:

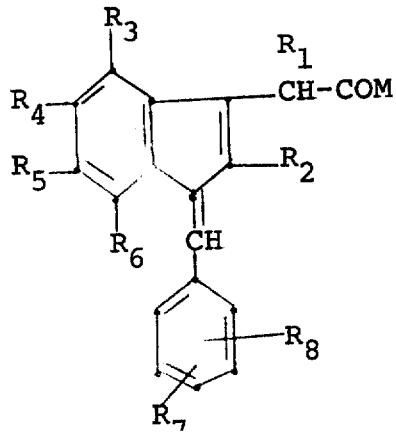

UNITED STATES PATENT OFFICE
CERTIFICATE OF CORRECTION

Patent No. 3,725,548          Dated   April 3, 1973

Inventor(s)  Shen, Greenwald, Jones, Linn and Witzel

It is certified that error appears in the above-identified patent and that said Letters Patent are hereby corrected as shown below:

PAGE 6

Column 28, the formula appearing in Claim 3 which reads:

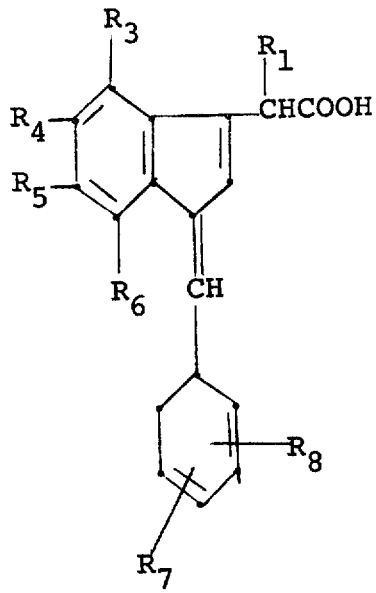

should be:

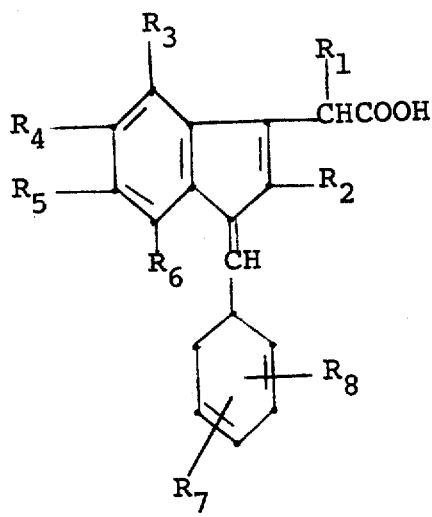

UNITED STATES PATENT OFFICE
CERTIFICATE OF CORRECTION

Patent No. __3,725,548__      Dated __April 3, 1973__

Inventor(s) __Shen, Greenwald, Jones, Linn and Witzel__

It is certified that error appears in the above-identified patent and that said Letters Patent are hereby corrected as shown below:

PAGE - 7

Column 29, the formula appearing in Claim 11 which reads:

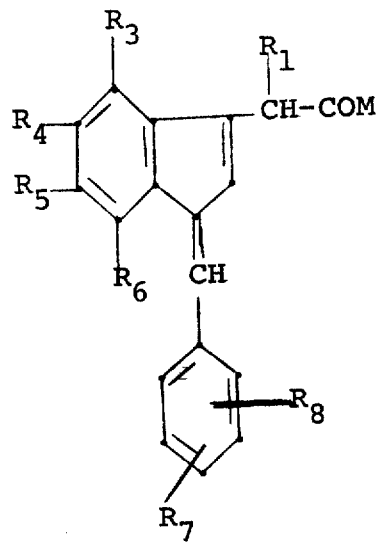

should be:

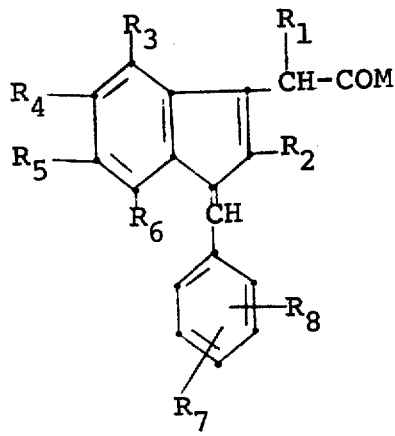

R-675.42-H

UNITED STATES PATENT OFFICE
CERTIFICATE OF CORRECTION

Patent No. 3,725,548              Dated  April 3, 1973

Inventor(s) Shen, Greenwald, Jones, Linn and Witzel

It is certified that error appears in the above-identified patent and that said Letters Patent are hereby corrected as shown below:

PAGE - 8

Column 30, line 5, "cyano" should be added.

Column 30, the formula appearing in Claim 12 which reads:

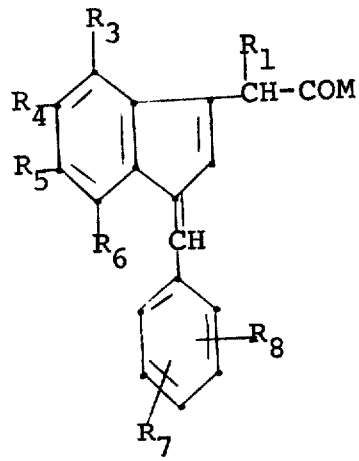

should be:

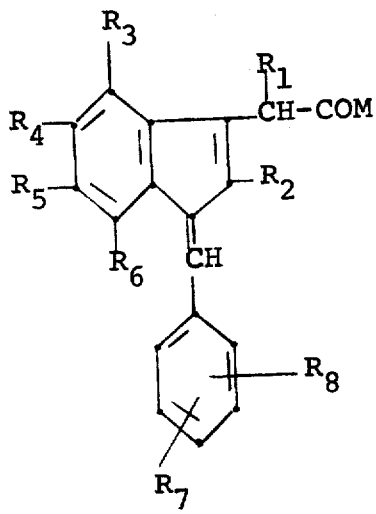

UNITED STATES PATENT OFFICE
CERTIFICATE OF CORRECTION

Patent No. 3,725,548          Dated  April 3, 1973

Inventor(s)  Shen, Greenwald, Jones, Linn and Witzel

It is certified that error appears in the above-identified patent and that said Letters Patent are hereby corrected as shown below:

PAGE - 9

Column 30, the formula appearing in Claim 13 which reads:

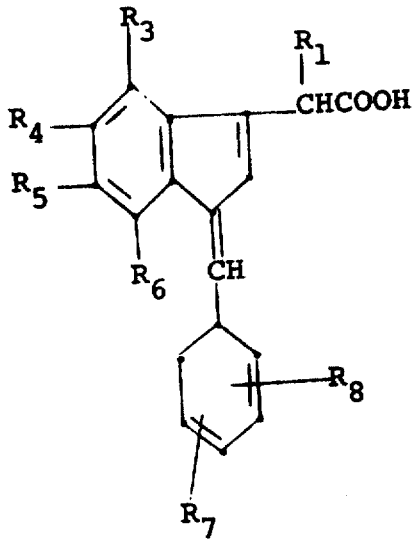

UNITED STATES PATENT OFFICE
CERTIFICATE OF CORRECTION

Patent No. 3,725,548             Dated April 3, 1973

Inventor(s) Shen, Greenwald, Jones, Linn and Witzel

It is certified that error appears in the above-identified patent and that said Letters Patent are hereby corrected as shown below:

PAGE - 10

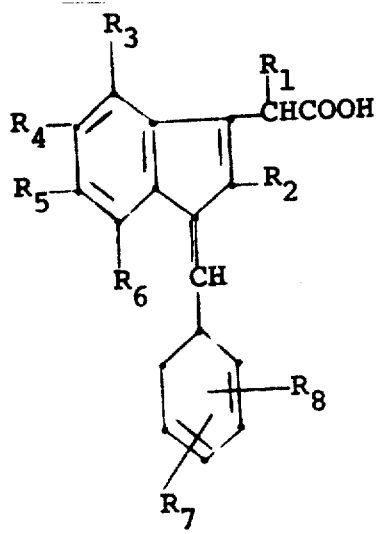

Signed and sealed this 1st day of January 1974.

(SEAL)
Attest:

EDWARD M. FLETCHER, JR.
Attesting Officer

RENE D. TEGTMEYER
Acting Commissioner of Patents